US008858313B1

(12) United States Patent
Selfors

(10) Patent No.: US 8,858,313 B1
(45) Date of Patent: Oct. 14, 2014

(54) METHODS, SYSTEMS, AND DEVICES FOR SYNCHRONIZED PARALLEL GAMEPLAY

(75) Inventor: Steven T. Selfors, Fort Lauderdale, FL (US)

(73) Assignee: Topspin Networks, Inc., Boston, MA (US)

( * ) Notice: Subject to any disclaimer, the term of this patent is extended or adjusted under 35 U.S.C. 154(b) by 165 days.

(21) Appl. No.: 13/544,520

(22) Filed: Jul. 9, 2012

Related U.S. Application Data

(63) Continuation-in-part of application No. 13/011,251, filed on Jan. 21, 2011.

(60) Provisional application No. 61/505,779, filed on Jul. 8, 2011, provisional application No. 61/336,601, filed on Jan. 25, 2010, provisional application No. 61/339,655, filed on Mar. 8, 2010, provisional application No. 61/339,715, filed on Mar. 8, 2010, provisional application No. 61/401,972, filed on Aug. 23, 2010, provisional application No. 61/402,899, filed on Sep. 7, 2010.

(51) Int. Cl.
*A63F 9/24* (2006.01)
*A63F 13/30* (2014.01)

(52) U.S. Cl.
CPC .................................... *A63F 13/12* (2013.01)
USPC ................................... 463/9; 463/42; 463/43

(58) Field of Classification Search
USPC ................................................. 463/9, 42, 43
See application file for complete search history.

(56) References Cited

U.S. PATENT DOCUMENTS

| 5,695,400 | A | 12/1997 | Fennell et al. | |
|---|---|---|---|---|
| 5,816,918 | A | 10/1998 | Kelly et al. | |
| 6,612,932 | B2 | 9/2003 | Stern | |
| 2002/0142842 | A1 | 10/2002 | Easley et al. | |
| 2006/0068818 | A1* | 3/2006 | Leitersdorf et al. | 455/466 |
| 2006/0123079 | A1* | 6/2006 | Sturniolo et al. | 709/203 |
| 2007/0033107 | A1 | 2/2007 | Ubale et al. | |
| 2007/0243936 | A1* | 10/2007 | Binenstock et al. | 463/42 |
| 2008/0293494 | A1 | 11/2008 | Adiraju et al. | |
| 2012/0179819 | A1* | 7/2012 | Hanson et al. | 709/225 |
| 2013/0288221 | A1* | 10/2013 | Kearns | 434/362 |

OTHER PUBLICATIONS

Case Study "There and Back Again: The Story of Subspace" by Zhichun Pu, Winter 2002, How They Got Game Project of the Stanford Humanities Lab (22 pgs.).
Non-final Rejection mailed from U.S. Patent and Trademark Office on Dec. 13, 2013 in parent U.S. Appl. No. 13/011,251 (5 pages).

* cited by examiner

*Primary Examiner* — Pierre E Elisca
(74) *Attorney, Agent, or Firm* — K&L Gates LLP

(57) ABSTRACT

In one embodiment, the invention relates to a network-based quiz game and related methods that is playable in parallel relative to and synchronized with an event of interest such as a sports event. This embodiment can be a massively multiplayer game in one embodiment. The players of the game include various participant using electronic devices. The game and relates methods can be implemented using a client server architecture and various hardware and software components.

23 Claims, 21 Drawing Sheets

METHODS, SYSTEMS, AND DEVICES FOR SYNCHRONIZED PARALLEL GAMEPLAY

RELATED APPLICATIONS

This application claims priority to and the benefit of provisional application U.S. Ser. No. 61/505,779, filed on Jul. 8, 2011. This application also is a continuation-in-part of non-provisional application U.S. Ser. No. 13/011,251, filed on Jan. 21, 2011, which claims priority to and the benefit of provisional application U.S. Ser. No. 61/336,601, filed on Jan. 25, 2010, provisional application U.S. Ser. No. 61/339,655, filed on Mar. 8, 2010, provisional application U.S. Ser. No. 61/339,715, filed on Mar. 8, 2010, provisional application U.S. Ser. No. 61/401,972, filed on Aug. 23, 2010, and provisional application U.S. Ser. No. 61/402,899, filed on Sep. 7, 2010. The entire contents of each of the above-identified applications are incorporated by reference herein.

FIELD OF THE INVENTION

The invention relates, in part, to a network-based game that is played relative to one or more other games or events and related methods, systems, and devices for implementing such a game.

BACKGROUND OF THE INVENTION

On any given day, millions of people around the world watch live events, competitions, and other events of interest in person or via a broadcast or other communication channel. These events are highly variable and typically do not remain static from moment to moment. These factors contribute to the worldwide popularity of live broadcast sports, particularly live video broadcasts. As game or event situations evolve, so too does the context of audience focus and interest.

Sports betting at casinos and other venues offers an additional form of entertainment associated with sports events. This type of betting typically allows a customer to bet relative to the casino on a specific general outcome, such as which team will win or lose. Although this is interesting to many, it lacks the ability to play synchronized quiz games in parallel with the live event of interest.

Therefore, a need exists for a games, devices, systems, and methods that offer users additional forms of entertainment relative to sports events or other events of interest.

SUMMARY OF THE INVENTION

In one embodiment, the invention relates to a computer-based method of implementing a quiz game in association with a live event. The method includes administering a game question concerning an impending outcome in a live event, the game question having an expiration event; storing the game question and the expiration event in a database; routing the game question using a data center to a population of participants in a format suitable for display on a mobile device; receiving a plurality of responses to the game question from the participants; evaluating a timestamp or a question duration time associated with each received response relative to the expiration event; and scoring the responses based on the evaluation of the timestamp or the question duration time and on the occurrence of the impending outcome in the live event or responses related thereto. The method can further include the step of collecting demographic data with respect to the population of participants. The method can further include the step of delivering a ranking of the population using the mobile device of the population. In addition, the method can further include the step transmitting an advertisement to one or more of the participants. The game question can relate to identifying an advertisement or a feature relating to an advertisement displayed during the live event. The method can further include the step of compiling information relating to actions taken by the population of participants with respect to their mobile devices. The population of participants can be a subgroup.

In one embodiment, the invention relates to a system for implementing a computer-based quiz game. The system can include a memory device; and a processor in communication with the memory device, wherein the memory device comprises instructions that when executed by the processor cause the processor to: store the game question and the expiration event in a database; route the game question using a data center to a population of mobile devices in a format suitable for display on a mobile device; receive a plurality of responses to the game question from the mobile devices; score the responses based on the evaluation of a timestamp or a duration set for the question and on the occurrence of the impending outcome in the live event or responses related thereto. In one embodiment, the game question is administered using a computer-based user interface and an author of the question, wherein the author is watching the live event such that the question is generated prior to the occurrence of the impending outcome. The communication channel transmitting the game question data can be decoupled from a broadcast source for the live event. In one embodiment, the population of mobile devices is controlled by a subgroup. The processor can be part of an application server in a data center. In one embodiment, the data center includes a load balancer, a database cluster, a storage area network switch, and a storage area network comprised of a solid-state drive, wherein the solid-state drive is in electronic communication with the storage area network switch, wherein the storage area network switch is in electronic communication with the database cluster; and wherein the database cluster is in electronic communication with the application server. In one embodiment, the application server manages persistent mobile device game application sessions during the quiz game and hosts message oriented middleware, wherein the middleware transmits questions and receives responses.

In one embodiment, the invention relates to a mobile device. The mobile device can include a processor; an input device; and a memory for storing computer readable instructions that, when executed by the processor, cause the processor to display a game question concerning an impending outcome in a live event, the game question having an expiration event and transmit a response entered using the input to a data center for scoring the response based on a timestamp associated with the response and on the occurrence of the impending outcome in the live event.

In one embodiment, the invention relates to a network-based quiz game and related methods that is playable in parallel relative to and synchronized with an event of interest such as a sports event. This embodiment can be a massively multiplayer game in one embodiment. The players of the game include registered users ("participants"). The game and related methods can be implemented using client server architecture and various hardware and software components. Participants can log in using a graphic user interface and compete against each other simultaneously while an event of interest is occurring. The competition between users may be based on their relative ability to respond correctly to quiz questions. In one preferred embodiment, these questions relate to impending play outcomes within an event such as a sports event. Exemplary sports events an include, but are not limited to professional, collegiate, Olympic, and international sports competitions being broadcast live in video over cable, satellite, wireless, or Internet, or other communication channels.

In one embodiment, the invention relates to a computer-based game or platform that enables dispersed sports fans to compete with each other based on the quality of their sports intuition on the outcome of impending play outcomes made by players, coaches, and teams during sports games. Outcomes can be many things such as success or failure of a field goal, win or loss, the final score of a game, the number of points scored by a team, the number of homeruns in a game, whether a pitcher will attempt to pick off a base runner, whether a football defense will blitz, whether a pitcher is pulled prior to a particular inning etc.

In one embodiment, the invention relates to a network-based quiz game and related methods that is playable in parallel relative to and synchronized with an event of interest such as a sports event. This embodiment can be a massively multiplayer game or system whereby quiz participants log into the quiz game from electronic participant devices that are connected to the quiz game by a network such as the internet or other wired or wireless data or communication network. Various graphical user interfaces can be used to administer the games described herein and present quiz questions.

In one embodiment, the methods, games, and software described herein can be implemented using various mobile or stationary computing devices or electronic participant devices. These devices can include mobile phones, smart phones, personal computers, network enabled televisions, laptops, tablet PCs, ebook readers, music players, video players, and video game consoles.

In one embodiment, the invention includes one or more data centers suitable for administering and processing data exchanges relative to a network-based game. In one embodiment, a data center can be a single computer or server running an administrator software application configured to communicate over a network with a plurality of participant devices. An exemplary data center can include a bank of networked computers, software components, hardware components, network infrastructure, software servers, software services, and software applications that enable administering, controlling, managing, and monitoring one or more of the game embodiments described herein and related data.

In various embodiments, the invention relates to various game types and embodiments. These games can be implemented using various computer-based platforms and data centers as described herein. One game embodiment includes a quiz game application that runs on electronic participant devices and enable quiz participation, interactivity and bi-directional communication with the game network and data center. The game can be organized as a series of questions relating to a specific broadcast sports event wherein the questions are delivered or presented periodically during the broadcast sports event to participants connected to the game network by electronic participant devices. For example, quiz question response types can include: multiple choice, true/false, yes/no, over/under, fill-in-the-blank. In one embodiment, point values are assigned to valid correct responses to quiz questions.

In one embodiment, the invention relates to a registration method whereby users register themselves for quiz game participation by providing information that is stored in the registered user database within the data center. In addition, registered user metadata is also stored in the data center. Registered user metadata can include a unique user id, demographic information provided by the user during registration and/or by the user from within the quiz game, password, behavioral and psychographic metadata derived from user (participant) behavior and from responses within quiz games (e.g. "active user" identification and tagging derived from the number of quizzes taken in past month, channel subscription(s), channel subscription start and end date, channel subscription history, participant's channel rating(s), participant's channel ranking(s), and other participant information provided by third parties or gathered by or from the quiz game.

In one embodiment, the invention relates to a quiz game access control method that authenticates users as registered users by comparing credentials provided by the user at log in against user credentials stored in the registered user database. In one embodiment, this is performed prior to the start of a quiz game that is synchronized in real time or otherwise played in parallel with an event of interest such as a sports event.

In one embodiment, the invention relates to a method to define and store in the data center metadata for each broadcast sports event. Broadcast sports event metadata can include a unique identifier for each broadcast sports event (i.e. event id), sport, broadcaster of the event (e.g. ESPN), re-broadcaster of the event (e.g. Dish Network), sponsor(s) of the broadcast (e.g. Chevrolet), date of broadcast, time of broadcast, time zone of broadcast, states, provinces, and cities receiving the broadcast, month of broadcast, year of broadcast, season (e.g. 2011-2012 season), regular season, post-season, championship, competing team names, competing school names, competing country names, competition name, and/or competing individuals names, length of broadcast, and assigned channel(s) as defined herein.

In one embodiment, the invention relates to a method to define and store in the data center event names ("event or events") by combining one or more broadcast sports event metadata dimensions (e.g. USA vs. Russia Hockey Mar. 1, 2012-7 PM EST). In one embodiment, the invention relates to a method to group one or more events into channels and a method to store channels in the data center. In one embodiment, the invention relates to a method to define channels within channels thereby forming a hierarchy of channels stored in the data center. In one embodiment, the invention relates to a method to define and store in the data center metadata for each channel.

In one embodiment, channel metadata includes a unique identifier for each channel (i.e. channel id), channel sponsor id(s), channel sponsor name(s), and channel name composed of a combination of one or more metadata dimensions comprising sport (e.g. soccer), slang terms for sports (e.g. hoops), descriptive sports terms (e.g. tournament), men's, women's, professional, collegiate, association name, amateur, Olympic, league name, competition name, country name, season (e.g. 2011-2012), regular season, post-season, championship; example channels: Post-Season Pro Hockey, Professional Football, European Soccer, Women's Doubles Tennis, Olympic Men's Skiing.

In one embodiment, the invention relates to a method to assign events to one or more channels and to store the assignments in the data center. In one embodiment, the invention relates to a method to charge and accept payment from registered users for subscriptions to a channel, multiple channels, or all available channels. In one embodiment, the invention relates to a method to notify participants of impending subscription expiration. In one embodiment, the invention relates to a method to define and store in the data center quizzes, each of which correspond to a specific broadcast sports event, and quiz metadata that can include a unique identifier for each quiz (i.e. quiz id), quiz name, associated event id, associated channel id, unique question id(s), sponsor id(s) for the quiz, sponsor name(s) for the quiz, and receiving subgroups, total number of questions, total possible points for each quiz. In one embodiment, quiz question authors are granted secure and prioritized access to the data center and authorization to publish quiz questions ("game administrators or administrators").

In one embodiment, the invention relates to a quiz management system whereby game administrator(s), connected to the data center by administrator software applications, author questions, assign point values to questions, publish questions to participants at various discrete times and at varying time intervals during an event, set question cutoff timestamps for question responses (used to validate responses as received by the data center prior to impending play completion) and record the correct response to each question. For example, a game administrator publishes a question at a critical moment: Will the Chicago Bears make this field goal? Yes or No for 30 points, the question cutoff timestamp (in UTC—Coordinated Universal Time) was set by the game administrator at 2011-12-19T16:39:57-08:00, and the correct response ended up being recorded by the administrator as NO.

In one embodiment, the invention relates to a method to store in the data center quiz questions that were delivered or otherwise presented to quiz participants using an electronic device. Various types of quiz questions and associated metadata can be used and generated in accordance with the invention. For example, a quiz question type can include "chance-type" quiz questions. This type of question relates to impending play outcomes within broadcast sports events (e.g. Will the pitcher be pulled from the game in the next inning? Yes or No for 20 points; what will A-Rod do in this at-bat? K, 1B, 2B, or HR, for 40 points). In addition, quiz question metadata stored in the data center can include quiz id, unique question id, question number, question author, timestamp when published, question format, question type, question point value, question cutoff type, question cutoff timestamp, associated event id, associated channel id, quiz sponsor id, quiz sponsor name, quiz question sponsor id, quiz question sponsor name, number of receiving participants, receiving subgroup(s), and associated broadcast sports event metadata.

In one embodiment, the invention relates to a method within the quiz game application running on electronic participant devices that displays to potential quiz participants, channels, events, and event broadcast schedule collectively, "channel listings". For example, 2011 Men's College Basketball would be a particular channel within which events (e.g. Notre Dame vs. Villanova Feb. 15, 2012 7 PM EST) are displayed and available for selection by potential quiz participants.

In one embodiment, the invention relates to a method for participants logged into the quiz game application to join a specific quiz by browsing through channel listings and then selecting a specific event from the quiz game application user interface. In one embodiment, the invention relates to a method within the quiz game application that enables potential quiz participants to see all available channel listings. In one embodiment, the invention relates to a method within the quiz game application that restricts users to participation in quizzes within channels to which users have an active paid subscription. In one embodiment the invention relates to channel, quiz, and quiz question sponsors. In one embodiment, the invention relates to a method to alter the display of the quiz game application thereby visually revealing to quiz participants the specific sponsor of the channel, quiz, or quiz question.

In one embodiment, the invention relates to a method to charge and accept payment from sponsors. In one embodiment, the invention can include a database of sponsors stored in the data center comprising sponsor contact information, sponsor name, unique sponsor id, corporate information and business metadata for each sponsor that can include DUNS number, SIC code, contract information, order details, current and historical information on sponsorship orders executed and/or planned, billing information, accounting information, and account status.

In one embodiment, the invention relates to a method to define and store in the data center quiz participant groupings. The system can use a "subgroup type" that categorizes subgroups; e.g. subgroup type "channel subscribers", subgroup type "bar", subgroup type "sporting venue", subgroup type "country", subgroup type "city", subgroup type "sponsor", subgroup type "business"; or subgroup type "buddy list."

In one embodiment, subgroup metadata stored in the data center includes subgroup type, subgroup name, unique subgroup id, participant's geographical location, registered user metadata, a business name, business or establishment address, a zip code, part of an address, a city, state or province (e.g. NC), a country, a sponsor, a sporting venue name or abbreviations thereof (e.g. Indy Motor Spdwy), and a physical area defined by a series of GPS coordinates. Further, subgroups can be defined by the combination of one or more subgroup metadata values e.g. Hooters-Main-Street-Raleigh-NC. Subgroup metadata can be stored in the data center. This metadata can include subgroup type, subgroup name, unique subgroup id, participant's geographical location, registered user metadata, a business name, business or establishment address, a zip code, part of an address, a city, state or province (e.g. NC), a country, a sponsor, a sporting venue name or abbreviations thereof (e.g. Indy Motor Spdwy), and a physical area defined by a series of GPS coordinates.

A subgroup can contain or include other subgroups. One subgroup can be defined that represents all subgroups. One or more subgroups can be defined that represent: subgroups within a country, subgroups within a state or province; subgroups within a city; subgroups receiving a particular broadcast sports event; or a subgroup that represents a list of friends. In one embodiment, the invention relates to a method for registered users to establish a subgroup of friends. In one embodiment, the invention relates to a method for business owners to establish their own unique subgroup e.g. Joe's Bar & Grill-123. In one embodiment, the invention relates to a method to charge and collect payment from sponsors, business owners, and individuals for creating their own unique subgroups (e.g. Harry's Bar & Grill-02). In one embodiment, the invention relates to a method for registered users to establish their own unique subgroup.

In one embodiment, the invention relates to an automated method to assign quiz participants to a subgroup or to multiple subgroups and to store that assignment in the data center. In one embodiment, the invention relates to an automated method to assign quiz participants to a subgroup for quiz play that includes using the location of the participants which is provided by the GPS function of an electronic participant device. The GPS coordinates can be used to determine subgroup assignment by locating the physical area in which the participant exists at the time he enters a quiz. This can be compared with the location with subgroups that have already been defined and stored in the data center (e.g. assign a participant to Yankee Stadium, if the present location of the participant is within the GPS coordinate boundaries of Yankee Stadium). In one embodiment, the invention relates to a method to assign a quiz participant to a subgroup for quiz play that includes enabling the participant to directly enter the unique subgroup id for a subgroup.

In one embodiment, the invention relates to a method to assign a quiz participant to a subgroup for quiz play that includes enabling the participant to select a subgroup from a user interface presented to the participant in the quiz game application running on an electronic participant device. In one embodiment, the invention relates to a method to store all participant subgroup assignments in the data center.

In one embodiment, the invention relates to a method to limit the number of subgroups for each quiz participant. In one embodiment, the invention relates to a publish/subscribe method provided by the data center that enables a massive audience of quiz participants to receive quiz questions nearly simultaneously and prior to impending live event plays or scenarios of interest. In one embodiment, the invention relates to quiz question publish/subscribe method that enables quiz participants to receive identical questions if the participants have joined the same quiz. In one embodiment, the invention relates to a method for participants logged into the quiz game application to display quiz questions on their electronic participant devices. In one embodiment, the invention relates to a method for participants to respond to questions prior to completion of impending plays by selecting a question response choice from a user interface displayed in the quiz game application on their electronic participant devices.

In one embodiment, the invention relates to a method within the data center to generate and apply timestamps to participant responses and a method to use the timestamps to verify that a response was received by the data center prior to the impending play actually occurring in the sports event and prior to the question cutoff timestamp set by the game administrator. In one embodiment, in the case of when a fixed duration for responding is set, the expiration event can send a violation flag back to the data center.

In one embodiment, the invention relates to a method to store participant responses and response meta data in the data center. In one embodiment, the invention relates to a method to verify the authenticity of the response sender to prevent cheating, spoofing, connection hijacking, and data center attacks. Various fields, flags and other tracking methods can be used to store quiz question responses. For example, for a given quiz question, the quiz question response type can be indexed or categorized in various ways such as valid, invalid, correct, incorrect, and no response. In one embodiment, "valid" can be used to categorize a response received by the data center, time stamped by the data center prior to the question cutoff timestamp, and verified by the data center as having been sent by an authentic response sender. Similarly, in one embodiment, "invalid" can be used to categorize a response received by the data center, time stamped by the data center after the question cutoff timestamp, and/or fails verification by the data center as an authentic response sender. In one embodiment, "correct" can be used to categorize a response received by the data center, time stamped by the data center prior to the question cutoff timestamp, verified by the data center as having been sent by an authentic response sender, and verified by the data center as the correct answer to the question as defined by the game administrator. Similarly, in one embodiment, "incorrect" can be used to categorize a response received by the data center, time stamped by the data center prior to the question cutoff timestamp, verified by the data center as having been sent by an authentic response sender, and determined by the data center to be an incorrect answer to the question as defined by the game administrator. In addition, quiz question response type "no-response" can be used to categorize a question for which the data center did not receive a participant response within a certain time from question publishing. The timestamp of the response can be determined a number of ways. For example, the timestamp may be based upon a participant's mobile device, a transmission network device, broadcast transmission sync between the participant's device and the game administrator.

In one embodiment, the quiz question response type valid can be defined as a response received by the data center, time stamped by the data center prior to the question cutoff timestamp, and verified by the data center as having been sent by an authentic response sender. In one embodiment, the quiz question response type invalid can be defined as a response received by the data center, time stamped by the data center after the question cutoff timestamp, and/or fails verification by the data center as an authentic response sender. In one embodiment, the quiz question response type valid-correct can be defined as a response received by the data center, time stamped by the data center prior to the question cutoff timestamp, verified by the data center as having been sent by an authentic response sender, and verified by the data center as the correct answer to the question as defined by the game administrator. In one embodiment, the quiz question response type valid-incorrect can be defined as a response received by the data center, time stamped by the data center prior to the question cutoff timestamp, verified by the data center as having been sent by an authentic response sender, and determined by the data center to be an incorrect answer to the question as defined by the game administrator. In one embodiment, the quiz question response type no-response can be defined as a question for which the data center did not receive a participant response within a certain time from question publishing.

In one embodiment, the invention relates to a participant response metadata stored in the data center comprising quiz id, question id, unique user id, response id, event, channel, UTC timestamp of received response applied by the data center, local time of submission as determined by electronic participant device, or quiz question response type.

In one embodiment, the invention relates to a method to calculate participant quiz scores and quiz accuracy rates; quiz scores defined as total points accumulated within a quiz; or quiz accuracy rate defined as total points accumulated divided by total possible points for a quiz expressed as a percentage.

In one embodiment, the invention relates to a method to store in the data center participant quiz scores and quiz accuracy rates for each quiz. In one embodiment, the invention relates to a quiz ranking system that ranks participants within quiz-subgroup combinations; quiz ranking system includes computing and storing participant rank and percentile rank in quiz-subgroup combinations based on in-process and final quiz scores, collectively "quiz scores and rankings" (e.g. $30^{th}$ percentile in California for Feb. 10, 2010 Georgetown vs. Villanova Men's NCAA game).

In one embodiment, the invention relates to a channel ranking system that ranks participants within channel-subgroup combinations (e.g. Men's Professional Golf-North Carolina participants) and stores channel rankings in the data center; channel ranking system includes computing and storing participant rank and percentile rank in channel-subgroup combinations based on each participant's aggregate quiz accuracy rate for all quizzes taken within a channel during a specific season; rankings are computed continually over the course of the relevant sports season for that channel, collectively "channel scores and rankings" (e.g. James Joyce—45th place for 2012-2013 season for Pro Football channel).

In one embodiment, the invention relates to a channel rating system that defines and assigns skill level groupings (e.g. Pro, Amateur, Novice, Rank Amateur) to each participant-channel combination ("channel ratings") and stores channel ratings in the data center; channel ratings are based on each participant's aggregate quiz accuracy rate for all quizzes taken within a channel during a specific sports season; channel ratings are computed continually over the course of the relevant sports season for that channel (e.g. 100 out of 1000 possible points earned by John Smith for quizzes taken by John Smith during the 2011-2012 Pro Football season equates to a 10% quiz accuracy rate within the Pro Football channel and a Novice Rating).

In one embodiment, the invention relates to a method for sending to participants logged into the quiz game application quiz scores and rankings, channel scores and rankings, and channel ratings. In one embodiment, the invention relates to a method for sending to quiz participants logged into the quiz game application periodic updates of their quiz scores and ranking during a broadcast sports event thereby maintaining participant interest in the quiz game over the course of the broadcast sports event. In one embodiment, the invention relates to a method within the quiz game application for participants to post quiz scores and the various rankings to social networking websites.

In one embodiment, the invention relates to a single dimensional and multidimensional analytics system to analyze and store in the data center quiz participation statistics and quiz completion statistics. Analytical dimensions can include all metadata stored within the data center (e.g. determine participation rate by channel). Quiz participation statistics and quiz completion rate statistics can be made along available metadata dimensions individually and in any logical combination of available metadata dimensions. In one embodiment, the invention relates to a single dimensional and multidimensional analytics system to analyze and store in the data center statistics related to quiz question responses. Analytical dimensions can include all metadata stored within the data center. Quiz question response statistical calculations can be made along available metadata dimensions individually and in any logical combination of available metadata dimensions.

In one embodiment, the invention relates to a single dimensional and multidimensional analytics system to analyze and store in the data center statistics related to quizzes; analytical dimensions include all metadata stored within the data center; quiz statistical calculations are made along available metadata dimensions individually and in any logical combination of available metadata dimensions; e.g. determine the average quiz score by subgroup where subgroup=New York for all quizzes in the Pro Football channel for events broadcast in November 2011.

In one embodiment, the invention relates to a method to insert advertisements ("quiz ads") within quizzes where the source of the advertisement is a 3rd party advertisement server. In one embodiment, the invention relates to a method to insert ads within quizzes where the source of the quiz ad is the data center. The invention also relates to an ad targeting method to control which quiz ads are displayed within specific quizzes and specific subgroups within specific quiz games. In one embodiment, the invention relates to a method to charge advertisers and collect payment for quiz ads run within quizzes.

In yet another embodiment, the invention relates to novel electronically networked, massively multiplayer quiz game of mixed chance and skill playable by a massive broadcast audience comprised of registered users ("participants") who are logged in and competing against each other simultaneously based on their relative ability a) to respond correctly to quiz questions related to impending play outcomes within professional, collegiate, Olympic, and international sports competitions being broadcast live in video over cable, satellite, wireless, or Internet, collectively, "broadcast sports events" and b) to respond correctly to quiz questions related to commercials broadcast within and during broadcast sports events ("broadcast ads"), and c) to respond correctly to quiz questions related to broadcast sports events.

In one embodiment, the invention relates to a registration method whereby users register themselves for quiz game participation by providing information that is stored in the registered user database within the data center. Registered user metadata can include a unique user id, demographic information provided by the user during registration and/or by the user from within the quiz game, password, behavioral and psychographic metadata derived from user (participant) behavior and from responses within quiz games (e.g. "active user" identification and tagging derived from the number of quizzes taken in past month, broadcast ad category affinity calculated from a participant's responses to quiz questions related to broadcast ads), channel subscription(s), channel subscription start and end date, channel subscription history, participant's channel rating(s), participant's channel ranking(s), and other participant information provided by third parties or gathered by or from the quiz game.

In one embodiment, the invention relates to a quiz game access control method that authenticates users as registered users by comparing credentials provided by the user at login against user credentials stored in the registered user database. In one embodiment, the invention relates to a method to define and store in the data center metadata for each broadcast sports event. In one embodiment, the invention relates to a broadcast sports event metadata that includes a unique identifier for each broadcast sports event (i.e. event id), sport, broadcaster of the event (e.g. ESPN), re-broadcaster of the event (e.g. Dish Network), sponsor(s) of the broadcast (e.g. Chevrolet), date of broadcast, time of broadcast, time zone of broadcast, states, provinces, and cities receiving the broadcast, month of broadcast, year of broadcast, season (e.g. 2011-2012 season), regular season, post-season, championship, competing team names, competing school names, competing country names, competition name, and/or competing individuals names; length of broadcast, and assigned channel(s) as defined herein.

In one embodiment, the invention relates to a method to define and store in the data center event names ("event or events") by combining one or more broadcast sports event metadata dimensions (e.g. USA vs. Russia Hockey Mar. 1, 2012-7 PM EST). In one embodiment, the invention relates to a method to group one or more events into channels and a method to store channels in the data center. In one embodiment, the invention relates to a method to define channels within channels thereby forming a hierarchy of channels stored in the data center. In one embodiment, the invention relates to a method to define and store in the data center metadata for each channel. In one embodiment, the invention relates to a method to assign events to one or more channels and store the assignments in the data center.

In one embodiment, the invention relates to using channel metadata. This metadata can include a unique identifier for each channel (i.e. channel id), channel sponsor id(s), channel sponsor name(s), and channel name composed of a combination of one or more metadata dimensions comprising sport (e.g. soccer), slang terms for sports (e.g. hoops), descriptive sports terms (e.g. tournament), men's, women's, professional, collegiate, association name, amateur, Olympic, league name, competition name, country name, season (e.g. 2011-2012), regular season, post-season, championship; example channels: Post-Season Pro Hockey, Professional Football, European Soccer, Women's Doubles Tennis, Olympic Men's Skiing.

In one embodiment, the invention relates to a method to charge and accept payment from registered users for subscriptions to a channel, multiple channels, or all available channels. In one embodiment, the invention relates to a method to notify participants of impending subscription expiration.

In one embodiment, the invention relates to a method to define and store in the data center quizzes each of which correspond to a specific broadcast sports event and quiz metadata that can include a unique identifier for each quiz (i.e. quiz id), quiz name, associated event id, associated channel id, unique question id(s), sponsor id(s) for the quiz, sponsor name(s) for the quiz, and receiving subgroups, total number of questions, or total possible points for each quiz. In one embodiment, the invention enables question authors to have secure and prioritized access to the data center and authorization to publish quiz questions ("game administrators or administrators").

In one embodiment, the invention relates to a quiz management system whereby game administrator(s), connected to the data center by administrator software applications, author questions, assign point values to questions, publish questions to participants at various discrete times and at varying time intervals during an event, set question cutoff timestamps for question responses (used to validate responses as received by the data center prior to impending play completion) and record the correct response to each question; e.g. a game administrator publishes a question at a critical moment: Will the Chicago Bears make this field goal? Yes, or No for 30 points, the question cutoff timestamp (in UTC—Coordinated Universal Time) was set by the game administrator at 2011-12-19T16:39:57-08:00, and the correct response ended up being recorded by the administrator as NO.

In one embodiment, the invention relates to a method to store in the data center quiz questions that were published to quiz participants. Various categories or quiz question types can be used. In one embodiment, quiz question types can include: 1) "chance type" quiz questions related to impending play outcomes within broadcast sports events e.g. Will the pitcher be pulled from the game in the next inning? Yes or No for 20 points; what will A-Rod do in this at-bat? K, 1B, 2B, or HR, for 40 points; will team B which is winning with 4:13 to play, hang on to win the game, Yes or No for 25 points; 2) "skill-ad-type" quiz questions that relate to broadcast ads (e.g. did Ford run an ad during this game that offers a $1,000 cash rebate? Yes or No? for 10 points), 3) "skill-event-type" quiz questions that relate to the broadcast sports event (i.e. to the live event) e.g. Has Mariano Rivera thrown a pitch over 95 mph in this game? Yes or No for 50 points.

Quiz question metadata stored in the data center can include quiz id, unique question id, question number, question author, timestamp when published, question format, question type, question point value, question cutoff type, question cutoff timestamp, associated event id, associated channel id, quiz sponsor id, quiz sponsor name, quiz question sponsor id, quiz question sponsor name, number of receiving participants, receiving subgroup(s), associated broadcast sports event metadata, and associated broadcast ad metadata for skill-ad-type questions.

In one embodiment, the invention relates to a method within the quiz game application running on electronic participant devices that displays to potential quiz participants, channels, events, and event broadcast schedule collectively, "channel listings". For example, 2011 Men's College Basketball would be a particular channel within which events (e.g. Notre Dame vs. Villanova Feb. 15, 2012 7 PM EST) are displayed and available for selection by potential quiz participants.

In one embodiment, the invention relates to a method for participants logged into the quiz game application to join a specific quiz by browsing through channel listings and then selecting a specific event from the quiz game application user interface. In one embodiment, the invention relates to a method within the quiz game application that enables potential quiz participants to see all available channel listings.

In one embodiment, the invention relates to a method within the quiz game application that restricts users to participation in quizzes within channels to which users have an active paid subscription. In one embodiment, the invention relates to a method to alter the display of the quiz game application thereby visually revealing to quiz participants the sponsor of the channel, quiz, or quiz question.

In one embodiment, the invention relates to a method within the quiz management system to notify the game administrator software application that a sponsor has ordered a skill-ad-type question for a particular quiz. In one embodiment, the invention relates to a method within the quiz management system to pre-populate the administrator software application with a link to a clip of the broadcast ad for which a sponsor has ordered a skill-ad-type question and the time which the broadcast ad will be broadcast during the broadcast sports event. In one embodiment, the invention relates to a method within the quiz management system to notify the game administrator that the broadcast ad having a sponsor has been broadcast during a broadcast sports event and thereby prompting the game administrator to publish a skill-ad-type question related to the broadcast ad.

In one embodiment, the invention relates to a method to prevent a game administrator from publishing sponsored skill-ad-type questions for broadcast ads that have not yet been broadcast during a broadcast sports event. In one embodiment, the invention relates to a method to charge and accept payment from sponsors.

In one embodiment, the invention relates to a database of the various types of data described herein. In one embodiment, a database of sponsors is used that includes sponsor contact information, sponsor name, unique sponsor id, corporate information and business metadata for each sponsor, DUNS number, SIC code, contract information, order details, current and historical information on sponsorship orders executed and/or planned, billing information, accounting information, and account status.

In one embodiment, the invention relates to an automated method to assign quiz participants to a subgroup for quiz play that includes using the geo-location of the participants which is provided by the GPS function of an electronic participant device and then determining subgroup assignment by locating the physical area in which the participant exists at the time he enters a quiz and comparing the location with subgroups that have already been defined and stored in the data center (e.g. assign a participant to Yankee Stadium, if the present location of the participant is within the GPS coordinate boundaries of Yankee Stadium).

In one embodiment, the invention relates to a method to assign a quiz participant to a subgroup for quiz play that includes enabling the participant to directly enter the code for a subgroup. In one embodiment, the invention relates to a method to assign a quiz participant to a subgroup for quiz play that includes enabling the participant to select a subgroup from a user interface presented to the participant in the quiz game application running on an electronic participant device. In one embodiment, the invention relates to a method to store all participant subgroup assignments in the data center.

In one embodiment, the invention relates to a publish/subscribe method provided by the data center, that a enables a massive audience of quiz participants to receive quiz questions nearly simultaneously and prior to impending plays. In one embodiment, the invention also relates to a quiz question publish/subscribe method that enables quiz participants to receive identical questions if the participants have joined the same quiz.

In one embodiment, the invention relates to a method for participants logged into the quiz game application to display quiz questions on their electronic participant devices. In one embodiment, the invention relates to a method for participants to respond to questions prior to completion of impending plays by selecting a question response choice from a user interface displayed in the quiz game application on their electronic participant devices.

In one embodiment, the invention relates to a method within the data center to generate and apply timestamps to participant responses. In one embodiment, the invention relates to a method to use the timestamps to verify that a response was received by the data center prior to the impending play actually occurring in the sports event and prior to the question cutoff timestamp set by the game administrator.

In one embodiment, the invention uses participant response metadata stored in the data center. This metadata can include quiz id, question id, unique user id, response id, event, channel, UTC timestamp of received response applied by the data center, local time of submission as determined by electronic participant device, quiz question response type.

In one embodiment, the invention relates to a method to calculate participant quiz scores and quiz accuracy rates; quiz scores defined as total points accumulated within a quiz; quiz accuracy rate defined as total points accumulated divided by total possible points for a quiz expressed as a percentage. In one embodiment, the invention relates to a method to store in the data center participant quiz scores and quiz accuracy rates for each quiz.

In one embodiment, the invention relates to quiz ranking system that ranks participants within quiz-subgroup combinations; quiz ranking system includes computing and storing participant rank and percentile rank in quiz-subgroup combinations based on in-process and final quiz scores, collectively "quiz scores and rankings" (e.g. 30$^{th}$ percentile in California for Feb. 10, 2010 Georgetown vs. Villanova Men's NCAA game).

In one embodiment, the invention relates to channel ranking system that ranks participants within channel-subgroup combinations (e.g. Men's Professional Golf-North Carolina participants) and stores channel rankings in the data center. Channel ranking systems include computing and storing participant rank and percentile rank in channel-subgroup combinations based on each participant's aggregate quiz accuracy rate for all quizzes taken within a channel during a specific season. Rankings are computed continually over the course of the relevant sports season for that channel, collectively "channel scores and rankings" (e.g. James Joyce—45$^{th}$ place for 2012-2013 season for Pro Football channel).

In one embodiment, the invention relates to channel rating system that defines and assigns skill level groupings (e.g. Pro, Amateur, Novice, Rank Amateur) to each participant-channel combination ("channel ratings") and stores channel ratings in the data center. Channel ratings are based on each participant's aggregate quiz accuracy rate for all quizzes taken within a channel during a specific sports season. Channel ratings are computed continually over the course of the relevant sports season for that channel (e.g. 100 out of 1000 possible points earned by John Smith for quizzes taken by John Smith during the 2011-2012 Pro Football season equates to a 10% quiz accuracy rate within the Pro Football channel and a Novice Rating).

In one embodiment, the invention relates to a method for sending to participants logged into the quiz game application quiz scores and rankings, channel scores and rankings, and channel ratings. In one embodiment, the invention relates to a method for sending to quiz participants logged into the quiz game application periodic updates of their quiz scores and ranking during a broadcast sports event thereby maintaining participant interest in the quiz game over the course of the broadcast sports event. In one embodiment, the invention relates to a method within the quiz game application for participants to post quiz scores and various rankings to social networking websites. The invention also includes a single dimensional and multidimensional analytics system to analyze and store quiz participation statistics and quiz completion statistics. In one embodiment, analytical dimensions include all metadata stored within the data center (e.g. determine participation rate by channel; determine drop out rate by day of week, average age, gender and subgroup cities having the highest broadcast ad effectiveness rating for category=beer); quiz participation statistics and quiz completion rate statistics are made along available metadata dimensions individually and in any logical combination of available metadata dimensions.

In one embodiment, the invention relates to a single dimensional and multidimensional analytics system to analyze and store in the data center statistics related to quiz question responses. Analytical dimensions include all metadata stored within the data center; quiz question response statistical calculations are made along available metadata dimensions individually and in any logical combination of available metadata dimensions. (e.g. determine the subgroup that was most likely to respond with a valid-correct quiz question response type to skill-ad-type questions for category=Automotive; e.g. determine valid-correct response rate for responses by gender for question id=45 which was related to broadcast ad id=7 (Coke Zero) which was run at 7 PM EST during event=Yankees-Red Sox on Aug. 8, 2010, where broadcaster=CBS→answer 67% of males gave a valid-correct response and 77% of women gave a valid-correct response); e.g. determine valid-correct response rate for responses related to Coke Ad ID=99 for all events in January 2010, where broadcaster=ESPN→answer 50% of males gave the correct response and 47% of women responded correctly; e.g. determine the valid-correct response rate to quiz questions by game administrator for events in the Pro Football channel).

In one embodiment, the invention relates to a single dimensional and multidimensional analytics system to analyze and store in the data center statistics related to quizzes. Analytical dimensions include all metadata stored within the data center. Quiz statistical calculations are made along available metadata dimensions individually and in any logical combination of available metadata dimensions (e.g. determine the average quiz score by subgroup where subgroup=New York for all quizzes in the Pro Football channel for events broadcast in November 2011).

In one embodiment, the invention relates to a method to insert advertisements ("quiz ads") within quizzes where the source of the advertisement is a 3$^{rd}$ party advertisement server. In one embodiment, the invention relates to a method to insert ads within quizzes where the source of the quiz ad is the data center. In one embodiment, the invention relates to an ad targeting method to control which quiz ads are displayed within specific quizzes and specific subgroups within specific quiz games. In one embodiment, the invention relates to a method to charge advertisers and collect payment for quiz ads run within quizzes. In one embodiment, the invention relates to a method to charge advertisers and collect payment from sponsors for skill-ad-type questions published within quizzes.

In one embodiment, broadcast ad categories that are assigned a broadcast ad category name (e.g. automotive, domestic automotive, sports cars, alcohol, beer, spirits, TV shows, movies, military, US Marine Corps), and a broadcast ad category unique id, and stored in the data center. In one embodiment, the invention relates to method to assign broadcast ads to a category or multiple categories; said assignments are stored in the data center (e.g. Budweiser assigned to Beverages category and also to Alcoholic Beverage category).

In one embodiment, the invention relates to a method to assign and record in the data center metadata related to broadcast ads. The broadcast ad metadata stored in the data center can include a broadcast ad name, unique broadcast ad id, first broadcast date, date(s) of broadcast, event, channel, UTC timestamp of broadcast, broadcaster (e.g. ESPN), product, service, organization, or media product advertised (e.g. Coke, US Marine Corps, TV Series), broadcast ad organization (e.g. IBM), broadcast ad organization id, categories, receiving subgroups (e.g. Country, State), hyperlinks to video clips of broadcast ads, and other metadata related to broadcast ads, collectively, "broadcast ad metadata."

In one embodiment, the invention relates to a single dimensional and multidimensional analytics system to rate and rank broadcast ad effectiveness for broadcast ads, collectively a "broadcast ad ratings system" based on data collected and generated from quizzes and quiz question responses, statistics related to quizzes, and statistics related to quiz question responses; analytical dimensions include all metadata stored within the data center; ratings and rankings for broadcast ad effectiveness are made along available metadata dimensions individually and in any logical combination of available metadata dimensions; e.g. determine the most effective automotive broadcast ad for subgroup=men for March 2010 within the Golf channel based on valid-correct response rate to category=automotive and quiz question type=skill-ad-type; e.g. determine the subgroup city with the lowest broadcast ad effectiveness for Budweiser.

In one embodiment, the invention relates to a method within the broadcast ad ratings system to compute ratings and rankings for categories; analytical dimensions include all metadata stored within the data center; quiz statistical calculations are made along available metadata dimensions individually and in any logical combination of available metadata dimensions.

In one embodiment, the invention relates to a method to record broadcast ad rankings ratings in the data center. In one embodiment, the invention relates to a method to charge fees for statistics and analyses related to broadcast ad effectiveness. In one embodiment, the invention relates to administrative software applications and automated data loading services that enable administrators to import data and metadata into the data center (e.g. import channel listings, sponsors, broadcast ads, broadcast ad schedules).

All of the proceeding embodiments can be combined together individually or in the aggregate and all such embodiments are within the scope of the invention. In addition, all methods and techniques described herein can be implemented as stand alone methods or as a processor-based system or method. In one embodiment, such a system includes an electronic memory device; and an electronic processor in communication with the memory device, wherein the memory device comprises instructions that when executed by the processor cause the processor to execute one or more of the method steps described herein.

In one aspect the invention relates to a computer-based method of synchronizing activity across a network including mobile devices with a live event. The method includes synchronizing a plurality of backend servers to a trusted time source; transmitting, from the backend servers, a first electronic message to a plurality of mobile devices, the first electronic message comprising a first server timestamp, and a question timer; receiving a request for a second server timestamp from a mobile device; transmitting the second server timestamp to the mobile device in a second electronic message from one of the plurality of backend servers; a total in-transit time interval for the first electronic message calculated as: [(the second server timestamp−the first server timestamp)+(a factor)].

In one embodiment, the first electronic message comprises a question and a plurality of possible answers. In one embodiment, the second electronic message comprises a mobile device generated answer to the question. In one embodiment, the factor is an estimate of the time to complete sending the request from the mobile device and receiving the second server timestamp at the mobile device. In one embodiment, each of the plurality of possible answers is associated with a point value. In one embodiment, each of the point values is different, the different point values reflecting the probability associated with each possible answer. In one embodiment, the method further includes awarding points to a mobile account if the mobile generated answer is correct. In one embodiment, the method further includes displaying a ranking of the mobile accounts according to awarded points. In one embodiment, the method further includes categorizing rankings based on at least one of the categories chosen from the group consisting of: nation, world, league, friends, sport, location and event. In one embodiment, the method further includes ranking users of the mobile device in real-time. In one embodiment, the method further includes grouping user accounts according to a user preference. In one embodiment, the user preference is chosen from the group consisting of: friend, nation, world, sport, league, location, and favorite team.

In one embodiment, the method further includes providing a communication protocol between the mobile devices. In one embodiment, the method further includes transmitting a third electronic message to the plurality of mobile devices, the third electronic message comprising an overlay. In one embodiment, the overlay is a message selected from the group consisting of: an advertisement, celebrity message, administrative message, writer message, and filtered message. In one embodiment, the method further includes generating the first electronic message from a distributed authoring tool. In one embodiment, the authoring tool includes the capability to start and stop an event, an electronic message that initiates and an electronic message that ends the event.

In one aspect the invention relates to a system for implementing a computer-based quiz game. The system includes a memory device; and a processor in communication with the memory device, wherein the memory device comprises instructions that when executed by the processor cause the processor to: store the game question and the expiration event in a database; route the game question using a data center to a population of mobile devices in a format suitable for display on a mobile device, the game question comprising a timer value and a first server timestamp; receive a request for a second server timestamp from a mobile device; transmit the second server timestamp to the mobile device; receive a plurality of responses to the game question from the mobile devices, each of the responses comprising an answer to the question; award a score to the response, if the response matches correct answer as defined in the in the system; transmit a fourth message comprising correct answer for the game question; rank users among friends by sorting total score using the device processor; rank users against a player group that include the friends using backend processors, and transmit global rank to devices via another message. In one embodiment, the time remaining on each device is synchronized for each question by making a device by device adjustment of the question timer by subtracting: [(a second server timestamp−a first server timestamp)+(a factor)] from the question timer.

In one aspect the invention relates to a computer-based method of synchronizing activity across a network with a live event. The method includes selecting a live event displayed on a mobile device; receiving a question, response choices, a timer value and a first server timestamp relating to the live event; transmitting a request to the backend server for a second server timestamp; receiving an input from a user of the mobile device; and transmitting a response choice to the backend server within a period of time calculated as (the timer value)−[(a second server timestamp−a first server timestamp)+(a factor)]. In one embodiment, the method further includes the step of displaying the question on the mobile device if the period of time is non-zero. In one embodiment, selecting a live event generates a backend message and transmits the backend message to a MOM server. In one embodiment, a plurality of engines monitors the MOM server and wherein one or more engines process the backend message to add the user of the mobile device to a trivia game relating to the live event.

BRIEF DESCRIPTION OF DRAWINGS

The objects and features of the invention can be better understood with reference to the drawings described below. The drawings are not necessarily to drawn to scale; emphasis is placed instead being placed on illustrating the principles of the invention. In the drawings, numerals are used to indicate specific parts throughout the various views. The drawings associated with the disclosure are addressed on an individual basis within the disclosure as they are introduced.

DETAILED DESCRIPTION

Figure 1:
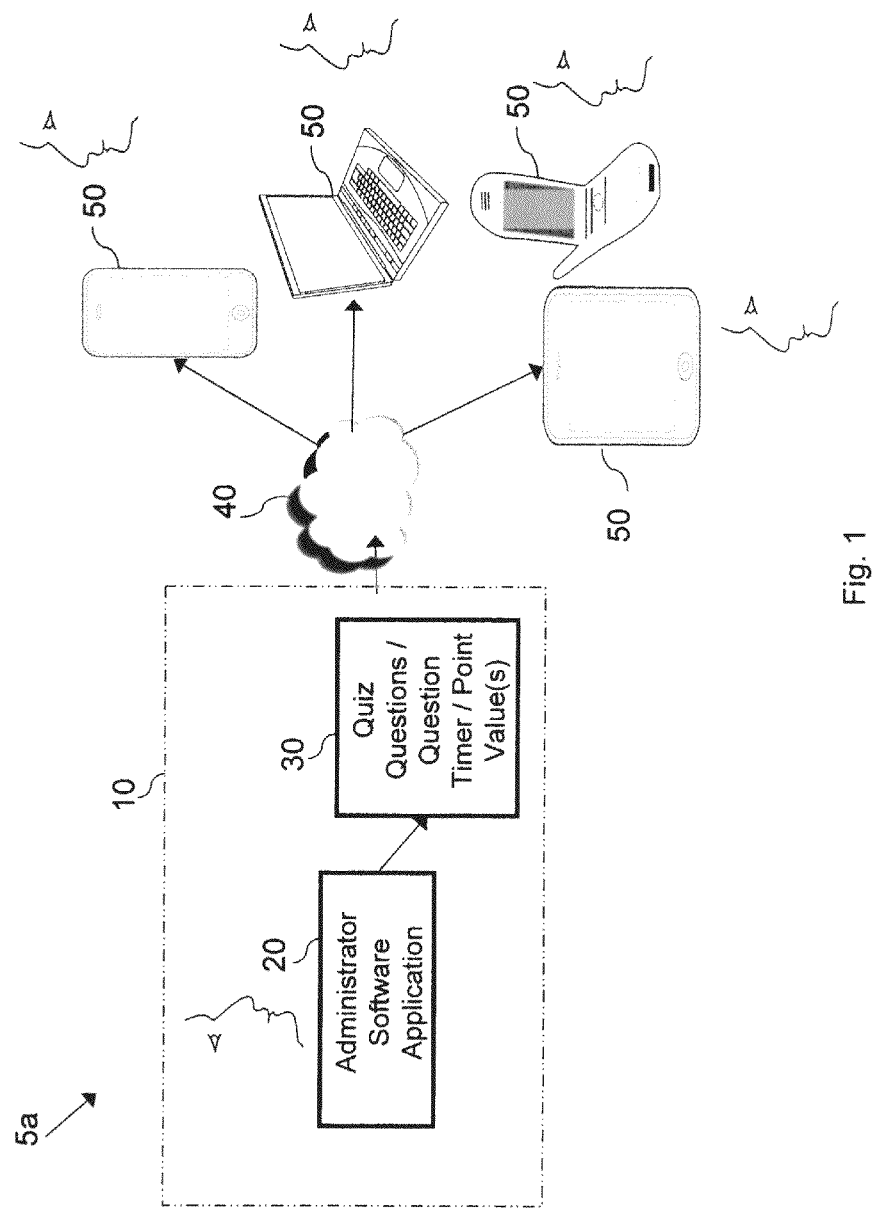
FIGS. 1-3 are schematic diagrams showing an overview of different systems and features thereof for implementing a quiz game over a network while an event is simultaneously being played, such as a sports event, in accordance with an illustrative embodiment.

The use of headings and sections in the application is not meant to limit the invention; each section can apply to any embodiment or feature of the invention.

Throughout the application, where compositions are described as having, including, or comprising specific components, or where processes are described as having, including or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. Moreover, the singular forms "a," "an," and "the" include plural forms unless the context clearly dictates otherwise. In addition, where the use of the term "about" is before a quantitative value, the present teachings also include the specific quantitative value itself, unless specifically stated otherwise.

It should be understood that the order of steps or order for performing certain actions is immaterial so long as the present teachings remain operable. Moreover, two or more steps or actions may be conducted simultaneously.

The aspects, embodiments, features, and examples of the invention are to be considered illustrative in all respects and are not intended to limit the invention, the scope of which is defined only by the claims. Other embodiments, modifications, and usages will be apparent to those skilled in the art without departing from the spirit and scope of the claimed invention.

Sports events and other events of interest have entertainment value for various reasons. One reason is the unpredictability and excitement that arises from guessing what may happen next or strategizing what a given coach, player, team or other participant in the event will do. For example, a basketball player picks ups 2 fouls in the first 28 seconds of an NCAA basketball game. The audience immediately begins to guess: will the player pick up a $3^{rd}$ foul quickly? Will he play the remainder of the first half? Will he end up fouling out of the game? Such conjecture is a common form of fan involvement in the live action. The uncertainty arising from the virtually endless number of game-specific situations is a fundamental part of the excitement surrounding live sports events.

As a result, during various arbitrary moments during a live video broadcast of a sports event fans often guess the outcome of impending plays unique to specific situations within an event (e.g. I think this base runner will attempt to steal second base). Fans are also inclined to guess the type of decision to be made by a player or coach (e.g. I think the manager will pull the home team pitcher before the $3^{rd}$ inning), scoring levels at various and arbitrary upcoming time points during an event (e.g. I think the home team will close to within 5 points with 5:00 minutes to play), player statistics at various and arbitrary upcoming time points during an event (e.g. I think the center will foul out with more than 10 minutes left in the game), team statistics at various and arbitrary upcoming time points during an event (e.g. number of pitches thrown by a struggling pitcher prior to the $5^{th}$ inning), and overall event statistics at various and arbitrary upcoming time points in an event (e.g. total points scored by both teams times prior to the next timeout), and other outcomes collectively: "impending play outcomes". Thus, in part, embodiments of the invention relate to games, systems, and methods for a massive broadcast audience separated geographically, to compete simultaneously individual-against-individual and individual-against-entire-broadcast audience in a quiz game based on the accuracy of their guesses related to impending play outcomes.

FIG. 1 shows a system 5a suitable for implementing a quiz game that allows participants to respond to questions that are generated in real time or substantially in real time while a sports event or other event of interest is being played or otherwise occurring. A data center 10 is shown that includes one or more computers to administer the game. In one embodiment, the data center includes a server running an administrator software application 20. The administrator software application 20 allows for the game to be managed relative to a sports event or other event of interest that is occurring while the quiz game is being played by various participants. The data center can also include a database and various other components. Additional details relating to specific data center embodiments are described in more detail herein. The application 20 can incorporate message oriented middleware and various graphic user interfaces in one embodiment configured to support or enable programming, executing and monitoring ongoing events, content and games. In one embodiment, an indicator on the administrators interface indicates the time since the last question was posed. Administrators may strive to pose a certain number of questions per hour, per event, or according to some other metric to maintain user interest during the contest.

A question generation module (not shown) can be used to generate quiz questions. This module can be part of the administrator application 20 or be a standalone module. It can access a database of sports trivia and game specific scenarios that interface with an artificial intelligence system or rules engine to generate questions that are synchronized relative to a sports event or other event of interest. The quiz questions 30 can be generated based on historic data and automatically presented to the participants by routing through a network to a participant device 50.

In one embodiment, the quiz questions are generated by sports enthusiasts, authors and experts in the area and entered into the systems 5a for delivery or presentation to the participants. As an example, a given quiz generated and delivered as described herein can include one or a series of questions relating to a specific broadcast sports event. These questions are published periodically during the broadcast sports event to participants connected to the game network 40 by electronic participant devices 50. The author of a given question that is created in real time based on a simultaneous occurring sports event or other scenario enters the questions into a graphic user interface. Once entered, the question is processed using the administrator software application 20 or another software module and routed over the network 40 to various participant devices 50. This presentation of the question on the devices 50 occurs on a real time or substantially real time basis. Responses from the devices 50 are likewise transmitted over the network to the data center 10.

The invention also includes quiz game applications that run on electronic participant devices 50 and enable quiz participation, interactivity and bi-directional communication with the game network and data center. This application can be distributed via an application store or otherwise made available to end users that want to participate in future games as described herein. In one embodiment, a browser-based application or the use of browser to access a remote game portal is used in lieu of a stand-alone quiz application.

Figure 2:
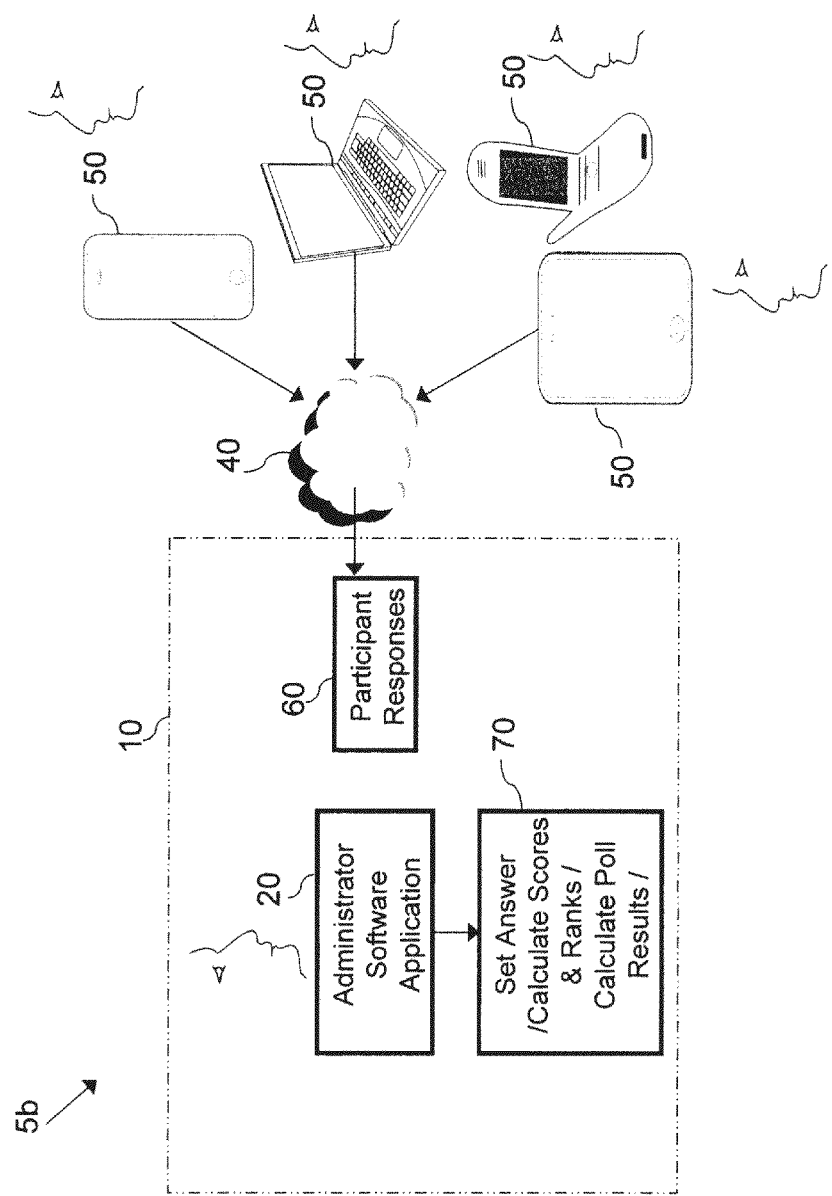

FIG. 2 shows a system 5b that includes substantially the same features of the system of FIG. 1. This system embodiment also includes additional details relating to participant responses 60 and a question cutoff timestamp 70. Once a sporting event or other event of interest is under way and a participant has logged into a server at or in communication with the datacenter 10 questions are generated and presented to the user as shown in FIG. 1. Typically, a number of participants are competing against each to answer a question that relates to a particular impending outcome in the sports event or other event of interest. Accordingly, there is a temporal component that dictates when a participant needs to respond. The question cutoff timestamp is set using a graphic user interface component of the administrator software application 20. In one embodiment, this cutoff 70 sets a window by which participants in the quiz game to need to respond to have their response to the questions considered.

Figure 3:
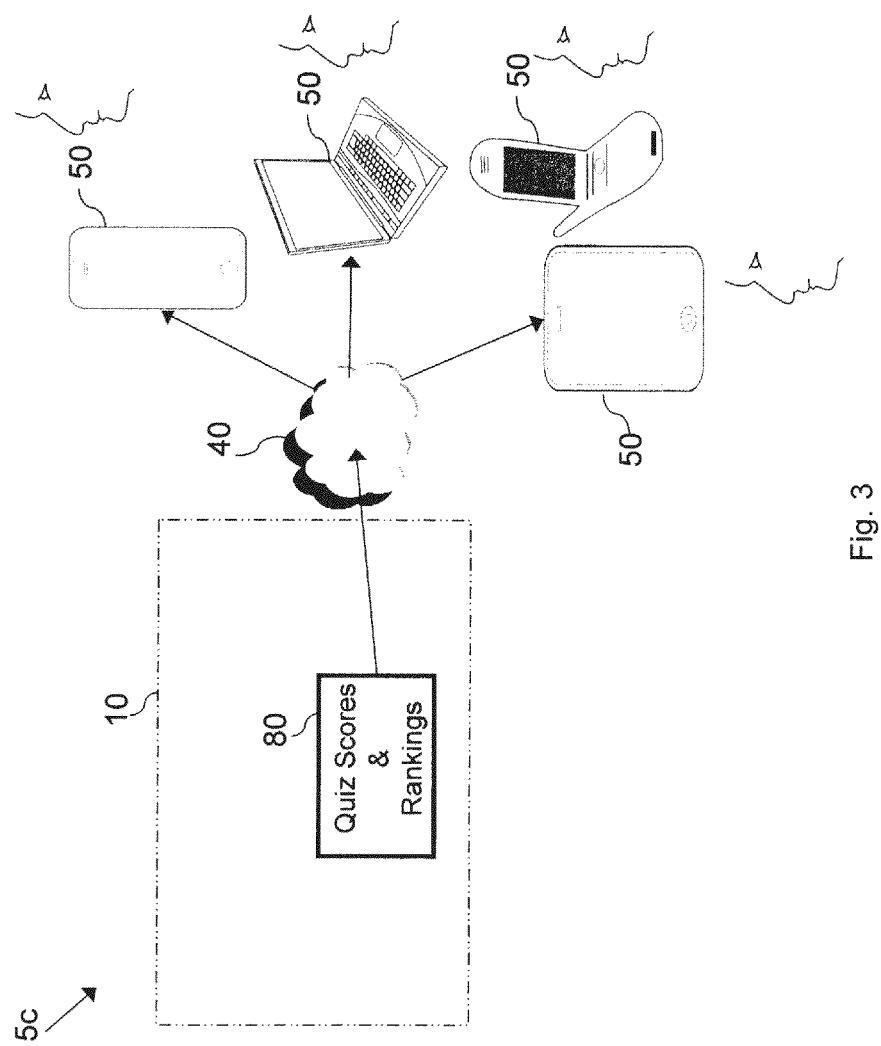

FIG. 3 shows a system 5c that includes substantially the same features of the systems of FIGS. 1 and 2 and some additional details relating to scoring and ranking. In this system embodiment 5c, a quiz score and ranking software modules is shown. Once a given question is answered the first correct responder can be notified and a score can be ascribed to that participant. In other embodiments, tiers of responding participants can be scored and ranked according to various criteria. The quiz scores and rankings can be updated over time on a per sports event basis or in the aggregate. This scoring and ranking allows friends and subgroups to track their progress and compete with each other. Subgroups can also have collective scores in one embodiment.

Figure 4:
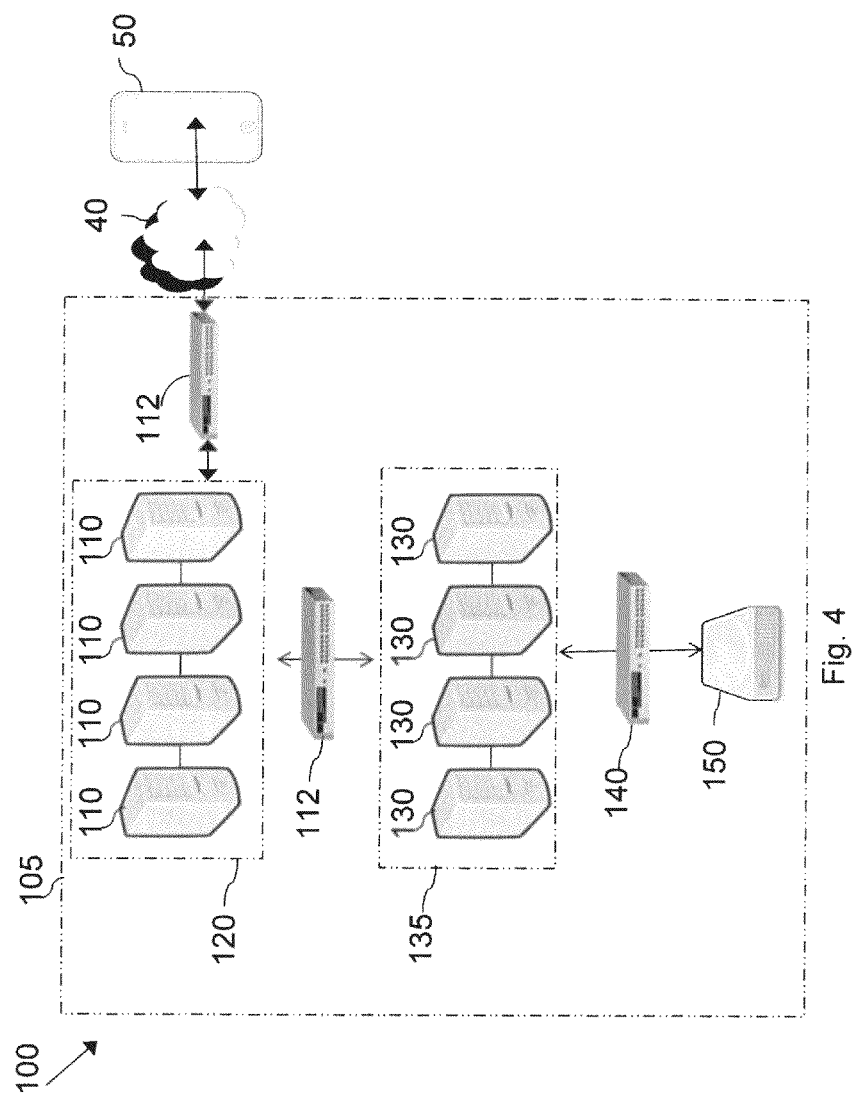
FIG. 4 is a schematic diagram of various hardware and other components suitable for implementing an exemplary multi-user quiz game while an event of interest is simultaneously occurring, in accordance with an illustrative embodiment.

FIG. 4 shows another system embodiment 100 suitable for playing a quiz game with a plurality of participants over a network 40 using participant devices 50 while a sports event is being played in parallel. The participant devices include any type of device that support the TCP protocol or other communication protocols, including smart phones, certain TVs, PCs, eReaders, and tablets (iPad) etc. and additional devices as described herein. This design feature can be advantageous relative to web protocols such as HTTP since the amount of overhead per message is minimal, whereas HTTP often has more header information than payload. In one embodiment, with a TCP connection, the game system or data center components transmit a minimum of information when TCP connections are made.

The system embodiment 100 shown is a multi-tier software and hardware architecture that includes clients, application servers, analysis servers, analytic servers, administrative software applications, database servers, and storage tiers. In one embodiment, the various tiers shown constitute a data center embodiment 105. However, the individual tiers or their constituent hardware components need not be located at a common location in one embodiment. In one embodiment, the term data center refers to the hardware and software required to operate, maintain, administer a given quiz game and all related data.

The first tier of this system 100 includes an application tier that includes a plurality of application server nodes 110. This collection of nodes form an application server cluster 120. Each application server node 110 provides scale out capability on low cost hardware. In turn, connections to the application server nodes are load balanced by a first network switch 112 or other suitable device. The switch 112 provides a load-balanced connection between network 40 and the application server cluster 120. A second network switch 112 provides connectivity to a shared disk database cluster 135 that includes a plurality of database nodes 130. In one embodiment, only one switch 112 is used. The database cluster is the second tier of this system embodiment 100. The third tier depicted is a storage area network (SAN) storage tier that is in communication with the shared disk database cluster 135 through a SAN storage switch or switches 140. In turn, the SAN switch 140 is in communication with one or more shared disks 150. One or more shared disks 150 provide persistent storage for all game data, metadata, and participant data and appear to the database nodes 130 as locally attached to the operating system of the nodes 130. In one embodiment, the shared disk 150 is a solid-state drive, which increases the random I/O performance of the system 100.

The application server cluster 120 can include one or more topics (i.e. a specific quiz is a type of topic for a specific sporting event, such as a baseball specific quiz for a given live baseball game); publication/subscription (i.e. pub/sub) services and connects to a database shared disk cluster 135 and performs write requests for quiz questions and quiz question responses. The application server cluster 120 also performs read requests for scores and rankings as requested by electronic participant devices 50. The shared disk database cluster 135 monitors communications channels for requests from the application server cluster 120 and automatically routes requests to the least busy database node 130 for processing. In turn, in one embodiment, the database nodes 130 handle all read and write operations and data reduction for scoring and ranking.

The shared-disk cluster design shown in FIG. 4 has significant advantages over traditional shared-nothing clusters. In the shared-disk architecture, scale-out is achieved by simply adding nodes. No software changes or data partitioning is required. In other words, the application software and database structures and overall system logic do not need to be modified to scale-out. They scale-out transparently. When additional capacity is needed (more participants subscribe to the game), additional, identical nodes are simply added to the network and capacity increases. In fact, capacity can be added to any tier independently. Adding nodes to the application tier increases connection capacity; adding nodes to the database cluster 130 augments the read/write throughput; and adding more disk capacity increases storage capacity.

In contrast, shared-nothing architectures require data locality in order to scale-out, which means that the application is required to be cluster aware. As a result, in a shared-nothing architecture application rework is necessitated when changes are made to the cluster. This causes risk, downtime, and cost increases. Therefore, in the face of unknown or rapidly increasing capacity requirements, the system of FIG. 4 and others described herein allows the system to scale and meet the growing demand for a massively multiplayer quiz game.

Figure 5A:
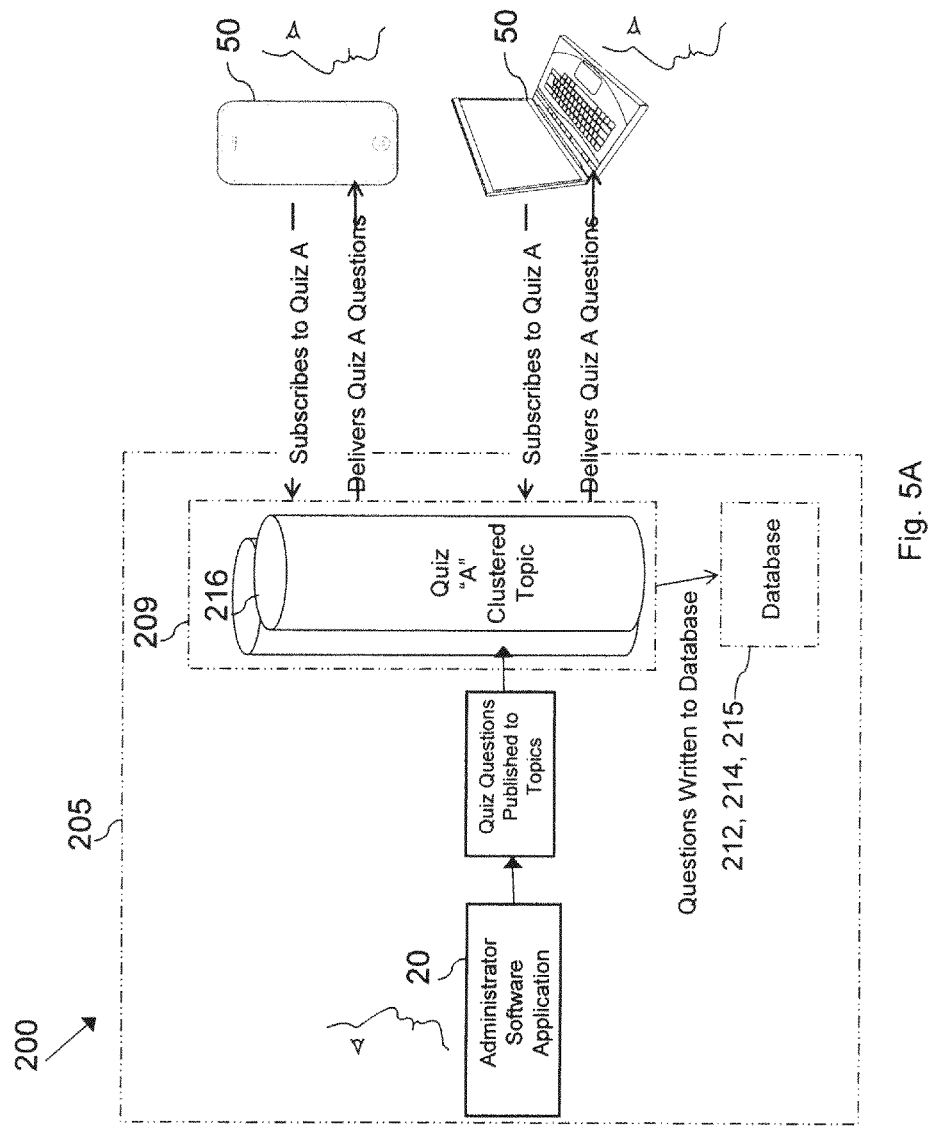
FIGS. 5A and 5B are schematic diagrams showing a process flow by which hardware and software generate and process questions for a quiz game played in parallel with an event of interest, in accordance with an illustrative embodiment.

FIG. 5A is a schematic diagram that shows a system 200 that includes a data center 205 for operating a quiz game embodiment while an event of interest is happening. An application server cluster 209 is shown with a plurality of application server nodes. As shown one or more of the nodes, includes message oriented middleware 216 that performs the publication and subscription embodiments of the question generation and distribution model. As shown, in one embodiment, questions are published to one or more topics hosted by the application server cluster. As shown, the questions themselves 212, 214, and 215 are stored in a database. This messaging technology can be used to integrate applications in a loosely coupled fashion. The design leverages the ability to publish to a clustered topic, which enables high numbers of users to receive the same message (quiz question) nearly simultaneously. Accordingly, this system embodiment is a scalable and fault tolerant approach for broadcasting messages to electronic participant devices.

Figure 5B:
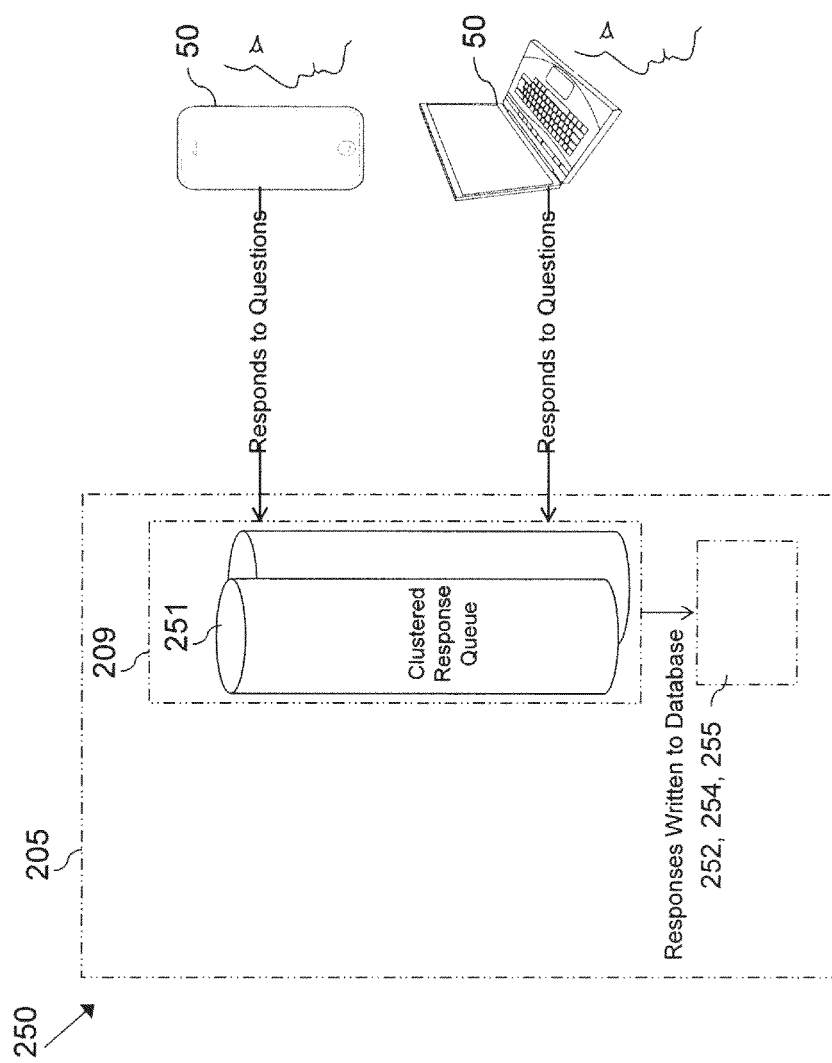

FIG. 5B is a schematic diagram that shows a system 250 that includes a data center 205 for operating a quiz game embodiment while an event of interest is happening. This embodiment can also be implemented using a form of message oriented middleware. This messaging technology is used to integrate applications in a loosely coupled fashion. The system 250 demonstrates a message queue response receipt model. As shown, in one embodiment, quiz question responses are published to message queues hosted by the application server cluster. The clustered response queue 251 enables a high numbers of users to respond to the same message (quiz question) simultaneously. The design leverages the ability to publish to a clustered message queue which is processed in parallel across the application server cluster, thus enabling high throughput write requests to the database cluster. This method is a highly scalable, fault tolerant method to maintain persistent client connections and to receive messages from massive numbers of participant devices.

Figure 6:
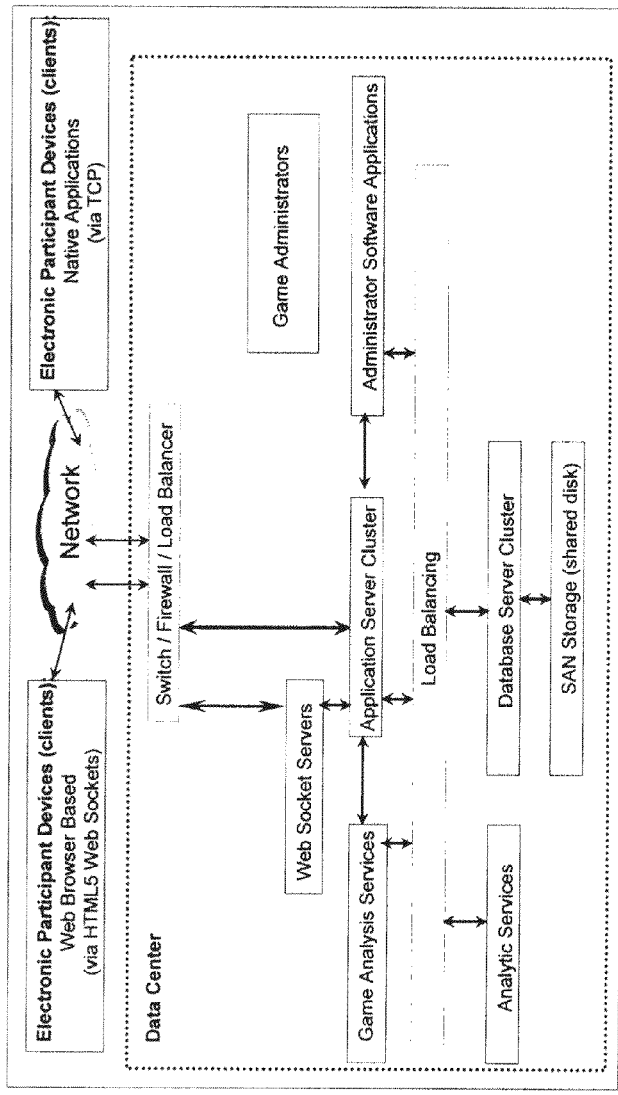
FIG. 6 is another schematic diagram of various hardware and other components suitable for implementing an exemplary multi-user quiz game while an event of interest is simultaneously occurring, in accordance with an illustrative embodiment.

In one embodiment, the system of FIG. 6 is an n-tier software and hardware architecture that includes clients, application servers, analysis servers, analytic servers, administrative software applications, database servers, and storage tiers.

A data center is connected to the game network such as the internet or any other suitable network. In one embodiment, the datacenter includes a plurality of electronically networked computers, software components, hardware components, network infrastructure, software servers, software services, and software applications that function collectively to operate, administer, control, manage, monitor, and secure the quiz game and related data.

The switch/firewall/load balancer (potentially a Cisco Catalyst 6500 with ACE module) provides security and ensures that client connections are made in a scalable, robust fashion to a cluster of message processing/business logic servers. These message processing/business logic servers are examples of engines that can be used with the MOM server cluster or other servers described herein. In one embodiment, a given engine can include one or more Java-based TCP servers performing parallel processing-based message handling and business logic and persistence writes to a clustered database which holds all persistent data in memory for real-time retrieval. The engines are configured to monitor incoming message-based requests on a cluster of MOM servers. A cluster of servers does not require message replication to servers in a cluster for all messages but may use replication for certain message classes such as user answer messages.

In one embodiment, incoming requests initiate on a log-in MOM server where a log-in request message is pushed by the mobile device to the MOM server and then processed by a login engine server. When authenticated, the user of the mobile device is redirected to a game MOM server cluster where the user awaits question messages. Question answers transmitted by a given mobile device are processed in reverse, meaning answers are device-sent messages dropped on message queues on the game MOM server cluster and then processed by the game engine servers.

As described herein, various engines can be used that persistently monitor the servers described herein such as MOM server clusters and then perform specific tasks or functions relating to maintaining the backend components that support a game and controlling various game play mechanics or other features associated with administering or interacting with the software features described herein. Exemplary engines can include a garbage collection engine (clean old record, remove old answers,), administrator engine (publish schedule, start game), rank engine, game engine, and log-in engine. In operation, as an example, mobile devices running a software application configured to provide the live event related gameplay features described herein connect to one or more MOM servers through the application. Once connected to the MOM servers, messages initiated by user actions with respect to the mobile device can be sent to a MOM server and similarly received from a MOM server. As a result, by having various engines monitoring the message traffic between the mobile devices and the MOM server various software routines and functions can be performed by a given engine. The entire system is load balanced, either in hardware, software or both, so that connections, reads, and writes utilize resources in a manner that maximizes data throughput and minimizes latency and response times. In one embodiment the load balancing in message processing is configured based on a stateless architecture using a plurality of engines to process load. For example, in one embodiment a stateless log-in engine listens to multiple login message queues simultaneously and the first engine to read a log-in request message is by definition the least loaded engine. In one embodiment, such an engine takes ownership to process and handle the message request. A stateless design allows the application to add game capacity by scaling-out using low-cost machines to perform identical functions (e.g. add more game engines to process more user answers).

The quiz game applications that run on electronic participant devices (client in n-tier) may be implemented as web applications (web browser based) or native applications (e.g. native iPhone application). In the case of native applications on the clients, low latency, low overhead TCP connections are made to and from clients (electronic participant devices) to the application server cluster. In the case of web browser-based client implementation, bi-directional communication is enabled via efficient HTML5 web sockets which in turn connect to the MOM servers. The client side applications enable registered users to browse channels for quizzes. By selecting an event from the channel listings, the user (participant) joins quiz game and is immediately in direct competition with other users who have entered the same quiz.

The MOM server cluster manages persistent client sessions and hosts message oriented middleware (MOM). MOM provides a highly scalable, clustered, asynchronous, multi-protocol messaging subsystem according to a publication-subscription ("pub-sub") methodology. The MOM system enables game administrators to broadcast quiz questions from the administrator applications to a massive audience of quiz participants. MOM can be implemented in conjunction with a service-oriented architecture (SOA) to implement various communication features. This is a preferred design since quiz questions are naturally described in text form (i.e. in message form).

Implementing the quiz game system described herein is based on real-time, bi-directional digital communication on a massive scale. However, network latency due to inefficient web protocols must also be managed. The use of a message oriented middleware and efficient TCP connections overcome many of these problems. Thus, in one embodiment a message oriented middleware is used to enable real-time or nearly real-time communications with a massive broadcast audience, separated by geography, to compete concurrently individual-against-individual and individual-against-entire-audience in a quiz game based on the accuracy of their guesses related to impending play outcomes. In addition, the exchange of data between game participants and the data center are decoupled from the game broadcast in one embodiment.

Electronic participant devices (clients) attach to MOM servers and listen for messages (quiz questions) published by game administrators to MOM topics (queues) each of which correspond to a specific broadcast sports event. Participants who have entered the same quiz are subscribed to the same MOM topic (event). Therefore all subscribers to a topic receive the same questions. In this pub-sub model, questions are pushed from the application servers to electronic participant devices without participants having to request quiz questions and thereby minimize latency between the time a question is published and the time it is received on the electronic participant devices.

In one embodiment, a database within the data center stores all data and meta data (e.g. registered users, user names, unique user id, encrypted passwords, events, channels, channel listings, quizzes, quiz questions, cutoff timestamps, sponsors, subgroups, participant responses, participant quiz scores, quiz rankings, participant ratings).

In one embodiment, the database is a RDBMS system. The RDBMS is configured in a shared-disk architecture for rapid, low cost, transparent scale out. The shared-disk database cluster architecture enables scaling by adding additional database server nodes as needed. This design is advantageous because it does not require costly and risky system changes to scale such as application code, database design, or system logic. In other embodiment, the RDMBS is an in-memory database shared-nothing cluster with replication for durability that provides high speed data access by avoiding spindle I/O bottlenecks of traditional disk-based databases.

When a participant responds to a quiz question by choosing a response from the graphic user interface on a participant device (client), the application server (clustered application servers) software timestamps the received question response, confirms authenticity of the response source, and writes the response (quiz question answer) along with validation metadata, and other metadata to the database via JDBC connectivity.

To eliminate traditional I/O bottlenecks related to reading and writing, the storage system can include a SSD storage system configured to present itself to the database cluster nodes as a locally attached drive. In one embodiment, the SSD storage system also incorporates board level RAID and is connected via high speed fiber channel interconnects to the database server cluster via SAN switches.

Periodically or upon command from the game administrators, the game analysis services software queries the database, calculates participant quiz scores and rankings, and writes those data to database tables or other high speed data store. The quiz game application that runs on electronic participant devices (clients) are programmed to make requests to via messages sent to MOM queues that are persistently monitored by engines which then query the database tables periodically or data store in order to update score and ranking information displayed on the individual user's electronic participant devices. By integrating with readily available social networking website APIs, the quiz game application is able to publish to social networking sites quiz scores and rankings, and channel rankings for individuals and subgroups.

The analytics services run periodically or on command and are generally for non-time-sensitive data such as broadcast ad rankings and ratings (broadcast ad ratings system), statistics related to quizzes, statistics related to quiz question responses, and channel ratings. The analytics services system uses database connectivity methods such as such as JDBC to connect to the database cluster, collect the appropriate data into the analytics services and generate results which are stored back to the database cluster persistently.

Administrator software applications enable the administrator to author quiz questions and submit them to the MOM system from the administrator engine for publishing to quiz participants. The application also writes the questions to the database for persistent storage. The administrator software applications require user authentication in order to prevent question publication and game administration by unauthorized users. In one embodiment, questions authored are stored with complete metadata required to track information such as which game administrator authored which questions thereby enabling a game producer performance measurement system i.e. which game producer has the lowest quiz dropout rate. Additional metadata associated with the questions includes, but is not limited to, question type, question value, cutoff type, game ID, channel ID, partner ID, Ad ID, Ad Category, Subcategory, timestamp, and other data suitable for enabling analytics and ratings as described herein. The game administrator applications run with high priority on the game network in order to minimize latency in publishing quiz questions.

Administrator software applications are connected to the database and have visibility into which upcoming broadcast ads have sponsors. Broadcast ads having sponsors are loaded into the quiz authoring system so that the administrator can pre-define skill-ad-type questions. The administrative applications also notify the administrator when the ad was actually broadcast, based on timestamps, thereby prompting the administrator to author and publish a skill-ad-type question related to such broadcast ads. Similarly if there is a sponsor for a quiz, then the administrator software applications can be configured to load the sponsor's logo and/or a message into the quiz game so that when users log in and select a quiz, it is readily apparent who sponsored the quiz (e.g. this quiz is sponsored by IBM).

Administrator software applications are also responsible for setting cutoff timestamps for quiz questions or question timer values, question type, question response choices, question response point values and for saving to the database correct response to quiz questions. The administrative software applications also enable data input of channel listings, sponsor information, billing information and other data required to operate the quiz game system and the underlying business processes.

Administrative software applications are responsible for monitoring system health, network health, backup and recovery as well as database replication, pruning and archiving as needed for long term storage on media with lower cost relative to the SSD storage system. In one embodiment, the subsystems in the data center utilize high speed networking technologies.

To begin using an electronic participant device such as a mobile device or computer to play one of the game embodiments described herein, fans simply open their electronic participant device and start the quiz game application or open a browser and go to a game portal. The participant will be challenged for log-in credentials and upon supplying credentials such as user id and password, the participant is presented with a start page having a greeting message, sponsor logo, and a list of channels. The participant browses channels and then chooses a specific event (quiz) and is then ready to receive quiz questions on his or her network connected electronic participant device. The participant then proceeds to submit responses to quiz questions thereby competing against a massively multiplayer audience comprised of participants who are watching the same live broadcast sports event. Quiz scores and rankings for the quiz game appear clearly on the participant device and are updated throughout the course of the broadcast sports event. In this way, participants can see their relative ability at guessing the results of impeding play outcomes. The application also displays the user's current channel ranking and rating which helps to maintain user interest in the quiz game.

Figure 7A:
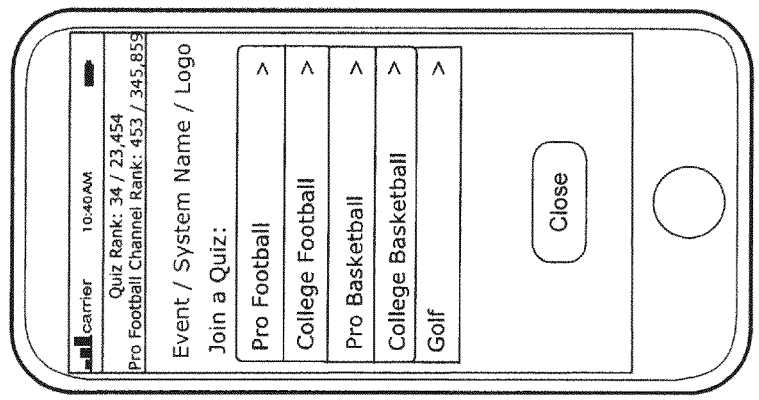
FIGS. 7A-7C are exemplary graphic user interfaces showing questions being delivered or presented to a participant in a given exemplary quiz game, in accordance with an illustrative embodiment.
Figure 7B:
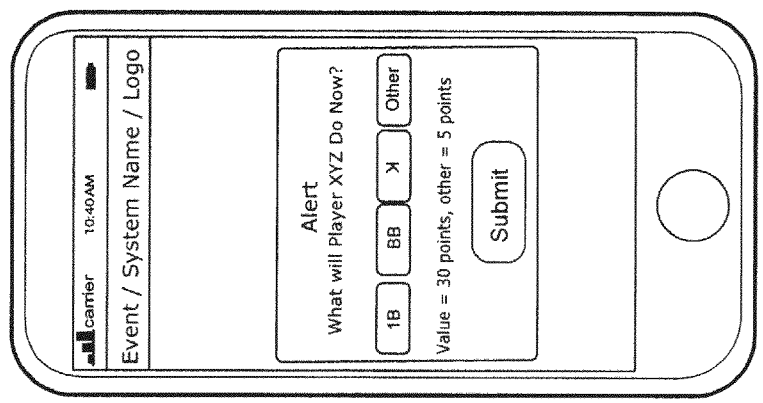
Figure 7C:
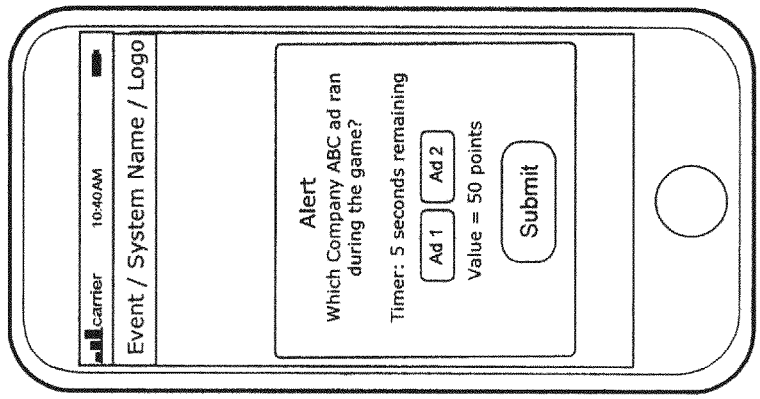

FIGS. 7A-7C are screenshots of graphic user interfaces displayed on a mobile participant device suitable for playing a network-based quiz game and exchanging data with a data center. The top level of the interface can include information relating to an Event, such as any event of interest. In addition, the System Name for the branded name of the quiz game itself any logos or brands of interest can be displayed using the graphic user interfaces shown. The interfaces can run within a browser or be implemented as standalone participant device applications.

In FIG. 7A, the interface presents a series of interface buttons that enable a participant to join a quiz that is specific to a particular type of sports event that has started or is about to commence, or is already underway. In this way, a participant can select quizzes based on their game or event preference. Once selected, various questions can be presented and participant responses can be received and transmitted using the mobile device.

FIG. 7B shows a user interface screen in which a question is being presented to a participant. Typically, this question is generated using a question generation module which can include an interface by which event experts watching the event of interest can type questions relative to an impending game event (such as whether a baseball player will hit a foul ball or swing and miss) and transmit their questions to all of the participants playing the game or otherwise watching the event of interest. The question shown in FIG. 7B shows a multiple choice question with four answers choice and an associated point value. For example, a more specific question would be, "What will Arod do at bat?" The answer choices are as follows: a single (1B), walk (BB), strikeout looking or other. The response to the question is sent from the mobile device to the data center for timestamp application, validation, processing, and scoring.

The questions presented can be subject to different rules and constraints set using an administrator software application in communication with the data center. One question constraint is a "cutoff type" question constraint. This constraint can be set using the game administrator interface. It sets the cutoff timestamp with respect to which a given question will be evaluated. For example, questions answered after an impending outcome occurs in a live game are rejected. The cutoff can also be automated by using a timer having duration set by administrator. The duration of the cutoff timer begins when the question appears on participant device and ends after cutoff timer reads 0 seconds remaining. In one embodiment, the cutoff timer uses the clock mechanism built into electronic participant devices. When responses are received by data center they can be validated against cutoff timestamp or by a timer duration violation check performed within the data center after the response is submitted.

FIG. 7C shows a screenshot of a graphic user interface displaying an advertising specific question. Given the enthusiasm for sports events, people are often more likely to watch advertisements when watching a live event on TV or through another communication medium. Questions that are directed to advertisements can be used to illicit responses that are of value to advertisers. In addition, participant activity on their mobile device can also be monitored using a monitoring module integrated with a quiz game application used to display the questions and transmit answers. This data can be sent back to the data center and analyzed. The result can be filtered and rendered anonymous as necessary and offered as a report or other product to advertisers or entities interested in demographic data. The data can serve as the basis for calculations and determinations of which ads are effective across varying demographics, location, sport, aired time, product, product category, and brand, for example.

In the following discussion of illustrative embodiments, a "mobile device" or a given "participant device" includes, without limitation, mobile phones, remote control devices, personal digital assistants, hand-held computers, ultra-mobile personal computers, and the like. Mobile device preferably includes a processing unit or processor, a system memory, a disk storage, a communication interface, an input device, an output device, and a system bus. System bus couples system components including, but not limited to, system memory to processing unit. The processing unit can be any of various available processors. A game application can also be resident in the system memory. This game application can be used to receive questions and display and interface for responding to the questions as shown in FIGS. 7A-7C. The game application can include various data elements and programs suitable for playing a quiz game during a live event of interest.

Exemplary Question Synchronizing and Related Gameplay Embodiments.

Figure 8:
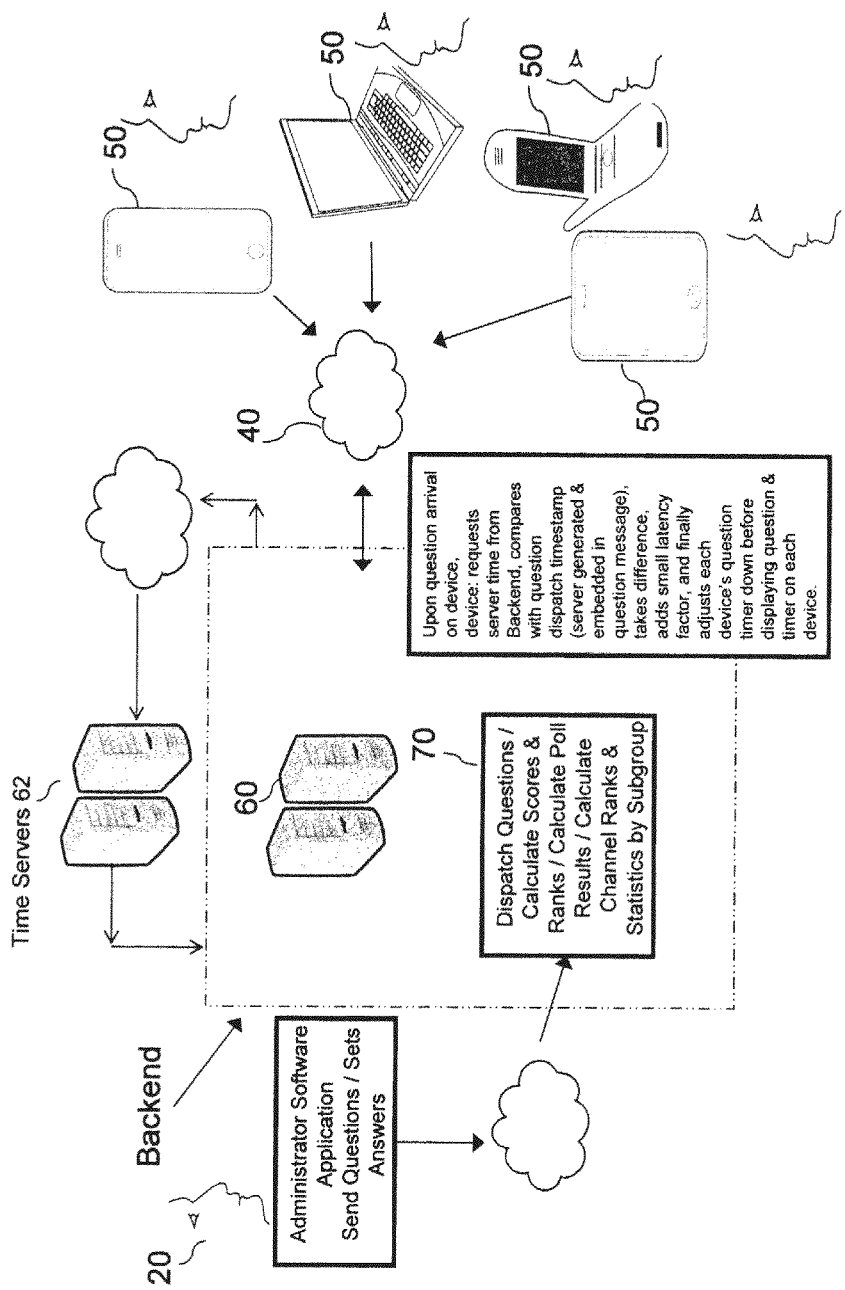
FIG. 8 is a schematic diagram of various hardware and other components suitable for implementing question timer synchronization across a large number of participant devices in accordance with an illustrative embodiment.

One embodiment of the invention relates to systems and methods configured to synchronize a question and answer activity across various network types, elements and network conditions. FIG. 8 depicts one embodiment in which a question timer is synchronized across a large number of participant devices 50. These devices are typically mobile devices as described above having a software application installed thereon. This gameplay related software application represents the client side of the data exchange of questions and answers with one or more networks and servers as described herein.

A recurring impediment to parallel gameplay across mobile or other networks relates to the objective of synchronizing activities across wireless carriers and Internet Service Providers (ISPs). Carriers and ISPs implement a variety of different technologies, backbones, routers, switches, routes, protocols, hardware, software, and policies. The networks have varying system load, customer count, latency characteristics, traffic volume, and usage patterns. All of which contribute to unpredictable network latency that can vary by time of day, geography, and the carrier involved. Therefore, it is difficult to operate a fair quiz game with time-limited questions sent to a massive audience of player devices by simply starting a timer when the question arrives on the device. Such an implementation is undesirable because it is impossible to have a deterministic question arrival time across devices when the goals of the game including answering first and answering correctly. With respect to players being given different amount of time to answer, it is clear that even a small difference of two seconds between players, in a fast paced real time or substantially real time game, can result in unfair outcomes and unhappy players.

Even during parallel gameplay within the same carrier network (e.g., AT&T, Comcast (ISP), Verizon), it is difficult to guarantee simultaneity of question arrival. The reasons are complicated but certainly no two messages take the exact same Internet route to the devices. Therefore, to ensure that no player has a detectable time advantage, one embodiment of the invention uses a timer synchronization method based on server synchronization coupled with an "ultra-light transaction" or request called getservertime( ) in order to determine the in-transit elapsed time for each question message to arrive on each device in a massive device population. The in-transit elapsed time plus a factor is subtracted from the question timer running as part of the gameplay software application on each device and thereby no player is given more time to respond than any other player. The devices are, in effect, synchronized. Also, according to one embodiment, at any given moment in time, the timer on different devices always displays the same "TIME REMAINING" for answering a particular question.

In one embodiment, the decision as whether or not to display a particular question as pop up through the software application is determined using the following value:

(a timer value)−[(a second server timestamp−a first server timestamp)plus(a factor)]

As a result, if the value generated above is zero or negative, no question will be displayed to the user of the mobile device. This follows because if the user will have no time to answer based on network or other data transmission conditions then there is no reason to display a question and frustrate the user. In contrast, if the time remaining is non-zero and positive then the software application can display the question message to the user. In one embodiment, this determination is performed on each device mobile device for each question to thereby synchronize all devices on time remaining so that the game is fair for all users.

Embodiments of the invention implement the above-described synchronization, as depicted in FIG. 8, as a non-limiting example, by synchronizing the backend servers 60 via a network time protocol (NTP) against a trusted clock source. This use of a trusted clock source ensures that all servers in the set of backend servers 60 can be used to provide consistent server timestamps when each device 50 in a massive audience makes a getservertime( ) request. The trusted clock source can be supplied by time servers 62. In one embodiment, one or more backend servers synchronize with the time server 62 (over NTP). Accordingly, the backend servers 60 can then synchronize with each other in one embodiment.

The system may then dispatch questions 70 from the Administration App (web app) over a network 40 to the devices 50. The dispatched questions contain a timer that limits the amount of time that a player has to respond. The question message metadata also contains the server time at which the question was transmitted from a backend server 60 or server cluster(s). Before displaying the question as a pop-up on the device 50, the device makes a request to obtain the current server time of a backend server as a reference point. This request can be made by an ultra-light transaction via a getservertime( ) request to one or more backend servers 60 in one embodiment.

In this way, synchronization is initiated as a client side request from the game application running on the applicable device 50. A back end server 60 responds to the request with the current server timestamp. The gameplay application running on the device 50 subtracts the original question transmittal server timestamp from the current server timestamp received to obtain a close estimate of the in-transit time for the question message. A latency factor is added to the in-transit time (where the latency factor is a constant in one embodiment). In one embodiment, the factor is determined as an estimate of the time to complete an average getservertime( ) transaction (20-100 ms). Additionally, the sum of the factor and the in-transit time is subtracted from the question timer that was originally defined by the game administrator. getservertime( ) is a low overhead transaction (low CPU, and bandwidth required) that is configured to be executed over a low-latency persistent TCP socket connection. Other server time request transactions can be used that reduce overhead and latency in other embodiments of the invention.

The synchronization methods and system components used to implement the same are fundamentally different from the standard web transactions which are based on high latency polling or other half-duplex techniques, and verbose protocols such as HTTP. For example, in the case of HTTP where the actual transaction payload is often many times smaller than total data transmitted for the transaction (i.e. verbose) efficient time synchronization can be precluded if the use of such a protocol is selected.

As an example of the time synchronization features described above, a player on a slow network may receive a 10 second question, but when it is displayed on the device, the question timer may start from 8 seconds (not 10 seconds) which reflects a 2 second downward clock adjustment based on the method above. The time decrement is determined on a participant by participant basis using each individual's mobile device in conjunction with a cluster of backend servers 60 that are synchronized with a trusted clock source 62. Such a method eliminates the potential unfair advantage that would otherwise be caused by variability in various networks, network congestion, differences in equipment, programming, routing, etc.

The time synchronization, according to one embodiment, is an efficient ultra-light transaction-based method that is configured to be effective in synchronizing player devices, even when the number of devices is extremely large (e.g. millions). The illustrative method of one embodiment also handles the problematic minimized app scenario. When applications are minimized, the application often terminates or sleeps. Standard messaging systems would simply deliver the question when the user maximized (bring app to foreground) the application. This would give a player an opportunity to cheat. One embodiment of the invention employs the same method described above to this problem. In additions the application will kill the question so that the user never sees the question if the calculation described above results in a negative time value (i.e. if the synchronized timer has no time remaining).

With respect to FIG. 8, each question timer's adjustment is unique to each device. In this way, each device is used to diagnosis the latency it will encounter during gameplay and determining a factor to shift the relative device time used for answering a question such it can be synchronized with other devices during gameplay. In addition, to scale the games described herein in one embodiment server can refer to a server or a cluster of servers. Finally, at any given moment, each device is connected to one server in the cluster(s) as shown in FIG. 8.

Another embodiment of the present invention includes a player game entry method suitable for defining how the players in parallel gaming enter a quiz contest, referred to herein as a Shootout. Various interface screens can be configured to perform such an activity. Various examples are described herein and depicted in the figures. One skilled in the art will recognize that the term Shootout is not limiting and other naming conventions for such gameplay may be used within the scope and spirit of the described embodiments.

Figure 9B:
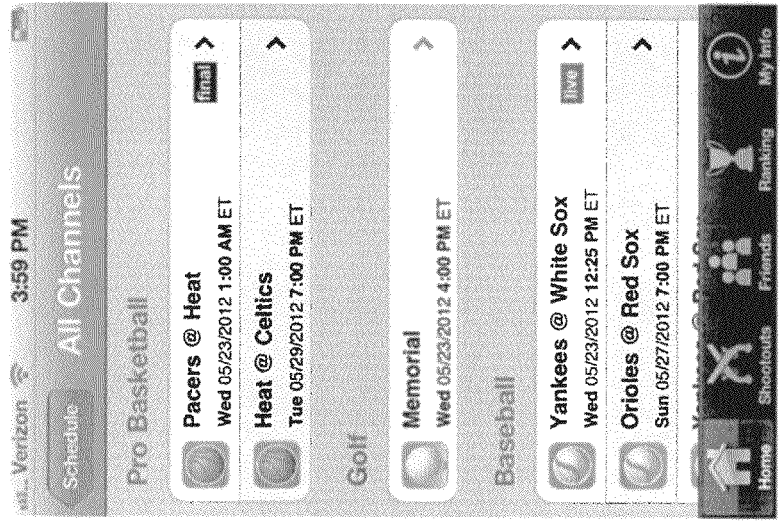
FIGS. 9A-9C are exemplary graphic user interfaces depicting a schedule of events in accordance with illustrative embodiments.
Figure 9A:
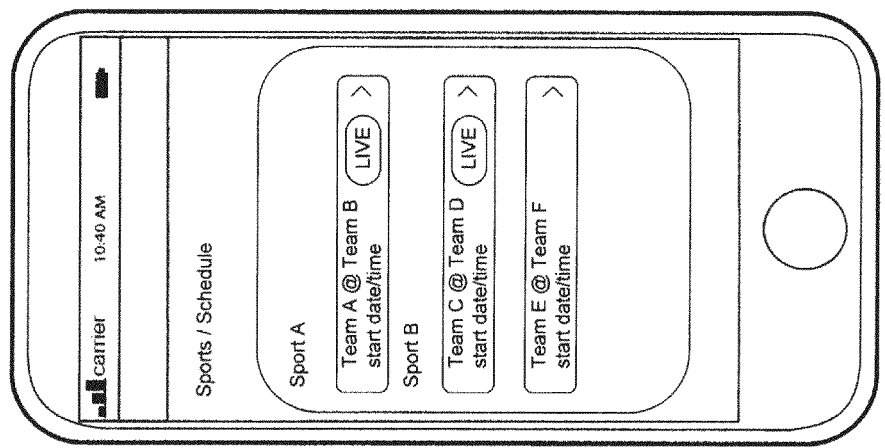
Figure 9C:
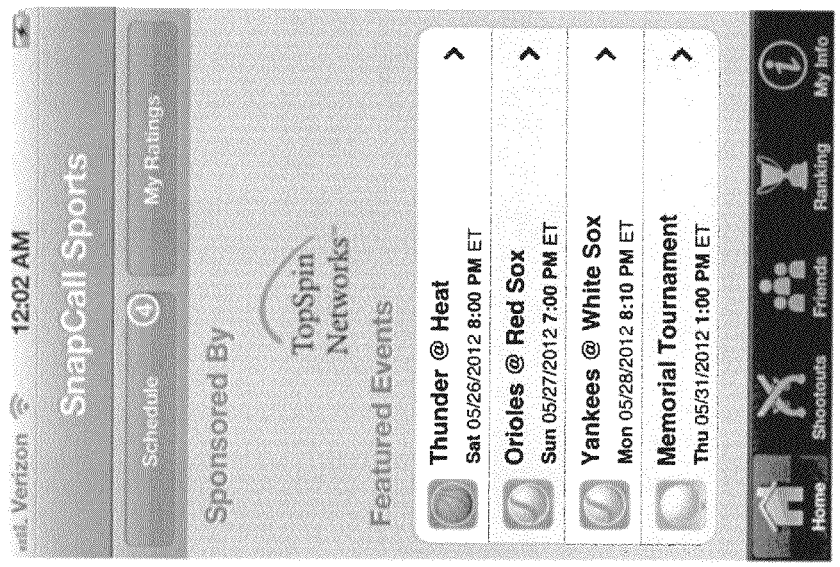

An inherent problem with gaming on mobile platforms is the limited screen space with which to list broadcast events and indicate which events are open for Shootouts. According to one embodiment of the invention, an event status indicator displayed on player's device notifies players that a Shootout has started or finished. LIVE or FINISHED indicators are embedded in a broadcast TV schedule and displayed for users to participating in using the software application described herein and their device of choice. Illustrative displays of a mobile device listing available events, shootouts and schedules are depicted in FIG. 9A-9C. FIG. 9A depicts a schedule of featured events listing a start date and time as well as a status indicator indicating if a listed event is upcoming, live, or ended (Final). FIG. 9B depicts a representative screen capture with the specific details described in connection with FIG. 9A where the schedule of events grouped according to the different sports (e.g., pro basketball, golf, baseball, etc.). The illustrative display of FIG. 9C depicts a schedule of featured events that may include a subset of all available events but featured by the administrator due to a sponsorship or other factor that may increase or prioritize the visibility of certain events. These exemplary interface screens can be used to participate in the advertised event such as a given Shootout.

To join a Shootout, the player simply pushes any listing with a LIVE indicator. According to one embodiment, when he does so, an automated Friends detection feature prompts the user that friends are available and offers to place the user into the Shootout that contains the most friends. One embodiment of the invention may include a display listing of friends or other participants currently involved in the Shootout. If none of the user's friends are currently playing in the Shootout, the player, in one embodiment may play alone, however data reflecting rankings as discussed below, is still collected and analyzed. The application also provides a screen that shows all Shootouts (games being watched by all of that user's friends). This is a visual method to announce to a user's friends what game he's watching. Such a feature provides a distinct and new way to see what live events are being watched by the user's friends. Another feature includes the ability to notify manually or automatically that a user has left the Shootout and/or joined another.

Figure 10B:
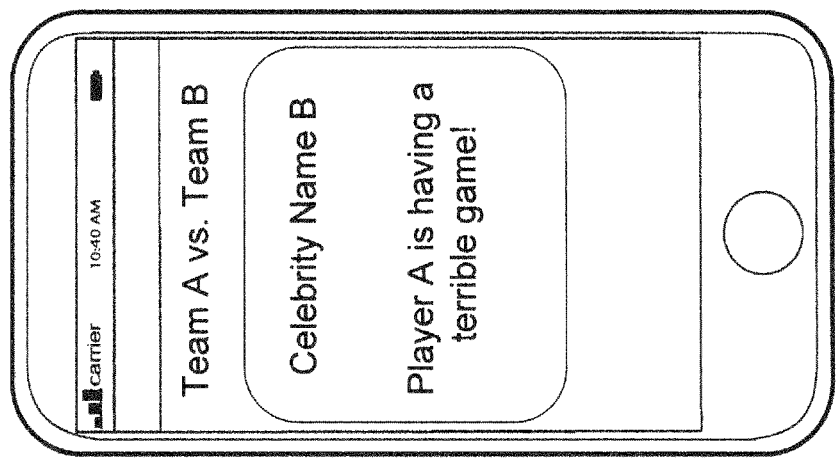
FIGS. 10A-10D are exemplary displays of various message overlay implementations in accordance with illustrative embodiments.
Figure 10A:
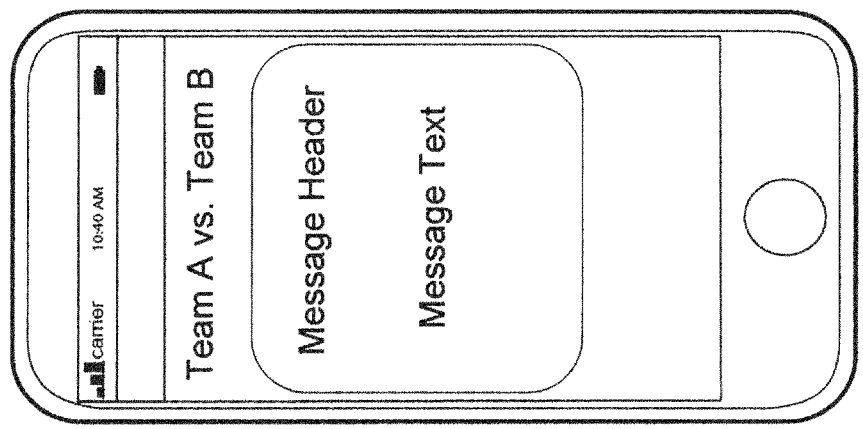

Gameplay during a shootout, according to one embodiment of the invention, is implemented through a message overlay implementation, as depicted in FIGS. 10A-10D. The background display of the Shootout includes a title bar describing the event during which the Shootout is taking place, such as Team A vs. Team B as shown in FIG. 10A. The administrator may send pop-up messages that have a customizable header that indicate whether the message pop up is a comment (i.e. from a celebrity, from a writers, from the administrators, or from an advertiser e.g. Header=Coke, Message=That was a tough inning. I need to open some happiness!). Types of messages included during gameplay may include, but are not limited to, questions, polls, celebrity messages, advertisements, administrative messages, status updates, upcoming events, or any other information an administrator deems appropriate for such a messaging environment. One embodiment of the invention may enable filtering so that when an overlay is an ad, it will be displayed only to those users that have appropriate filters.

Figure 10D:
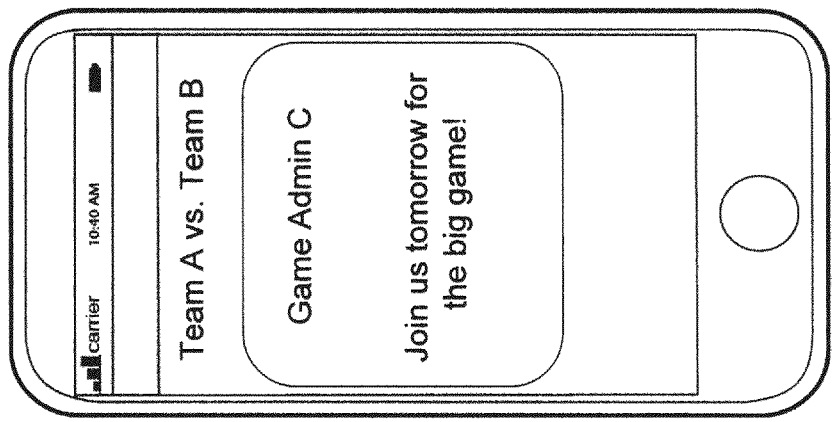
Figure 10C:
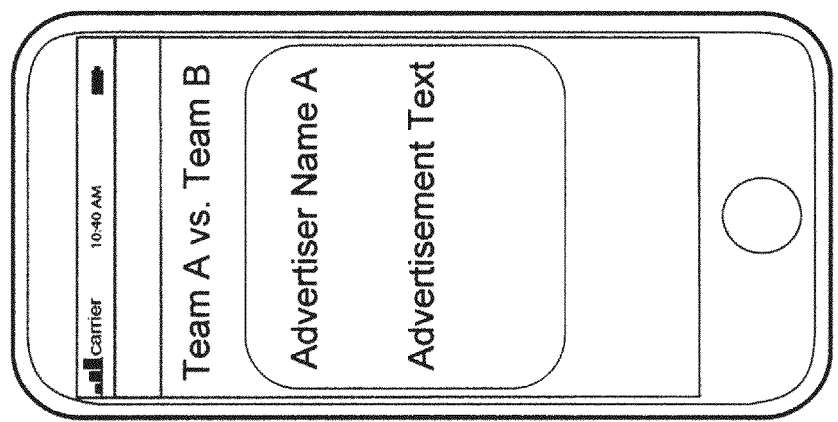

For example, a pop-up for Bob's Furniture (a northeast chain of stores), would only be visible if the user is located in CT, MA, or NY. When a message is transmitted from the game play administrator, a pop-op overlay message appears showing a message header and the text of the message. The message header may include a descriptor for the type of message included in the message text. FIG. 10B depicts a message overlay example in which the administrator publishes a comment from a celebrity involved with the Shootout. Celebrity interaction provides one of many stickiness factors that keep active players engaged and attentive to the game play experience. FIG. 10C depicts a message overlay including an advertisement, while FIG. 10D depicts an administrative message notifying players of an upcoming event.

Figure 11B:
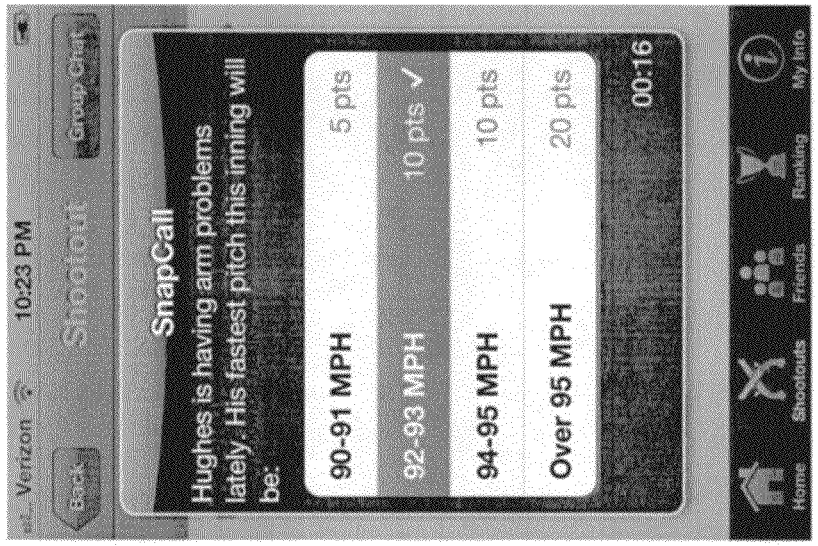
FIGS. 11A-11B are exemplary displays of an interactive question displayed in a message overlay in accordance with illustrative embodiments.
Figure 11A:
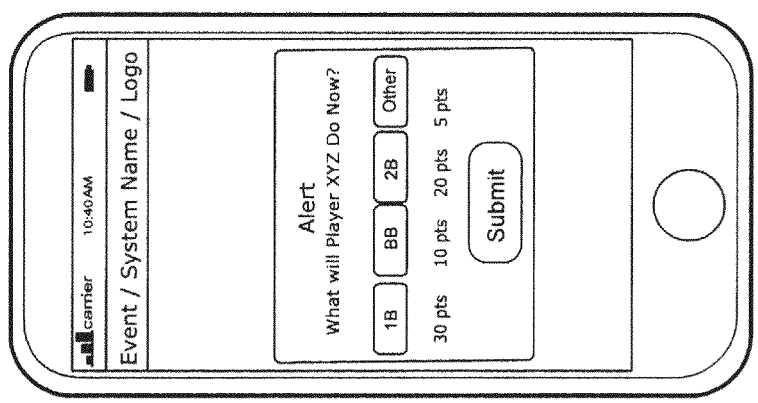

The message overlay implementation provides a unique gaming experience in which many players can simultaneously participate in a quiz-like atmosphere enhancing the experience of viewing or monitoring a sporting event. One embodiment of the present invention includes quiz-like questions relating to the action of an ongoing event in which multi-point per answer questions are posed. Questions in which each answer is worth a different number of points enables handicapping of the Shootout and makes for a more enjoyable gaming experience. For example, during a baseball game if a baseball player is up at bat, assume he has a 70% likelihood of making an out and 30% likelihood of getting a hit. It would not make sense to have each response be listed as: a) out; or b) hit and have the same point value because players would simply go with well-established odds. By handicapping point value, the application encourages players to take risks in their responses. Without such a handicapping feature, the gameplay would suffer because, for example, all users would guess that a player will make an out over a hit given that the best players make an out ~70% of the time. FIG. 11A depicts a user interface in which a question with multiple choice answers of ranging point values is published to the audience. Each answer is worth a different number of points, leading to a user's increased thought and risk-assessment as to what may actually happen. FIG. 11B depicts another exemplary display of such handicapping technique in accordance with an embodiment of the invention.

During a shootout, a question is posed to the users; in the case of FIG. 11B, asking how fast the current pitchers fastest pitch will be. Different point values are assigned to different ranges of speeds to accommodate for the probabilities of the correct answer. According to the question depicted in FIG. 11B, guessing 90-91 miles per hour (MPH) as the answer will only yield 5 points, if correct. This accounts for the probability statistics that the pitcher normally throws in the 90-91 MPH range and is the safest answer. Users are rewarded with higher point values for answering with less-likely outcomes; here a guess of over 95 MPH is worth of 20 points due to the rarity of the given pitcher throwing a pitch that fast. Embodiments of the invention include several other ways to handicap a score or maintain user interest. For example, this can be performed by posing questions with multiple correct responses.

Other embodiments of the invention implement features designed to keep a user's interest in the Shootout and in the parallel gaming environment in general. For example, the application may display correct answers on the device once the time has expired, display a friend's responses on the device (making the experience more social), and display audience statistics, such as the percentage of the audience that chose a particular response for each question (giving insight to the user as to whether it was a difficult question). Other features include zero point value questions in which a poll is taken within the Shootout. For example, a questions like "Did you like Joe Girardi's decision to pull the pitcher?" may be presented to the audience. While no points are given for responding, increased interactivity expands the stickiness of the application and maintains the user's interest and attention.

Figure 12B:
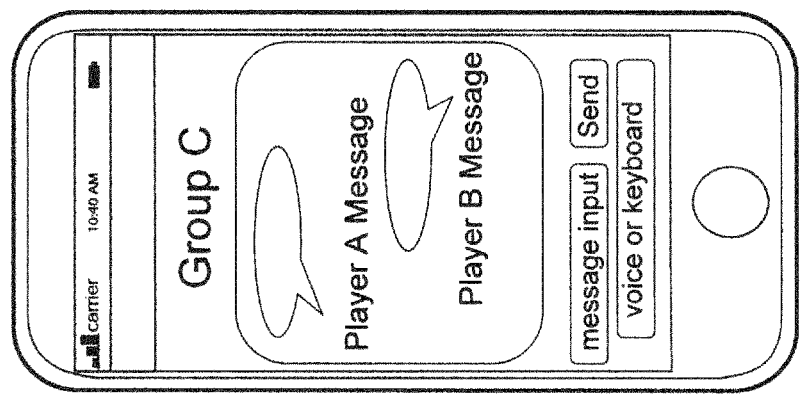
FIGS. 12A-12C are exemplary graphic user interfaces of various chat and messaging implementations in accordance with illustrative embodiments.
Figure 12A:
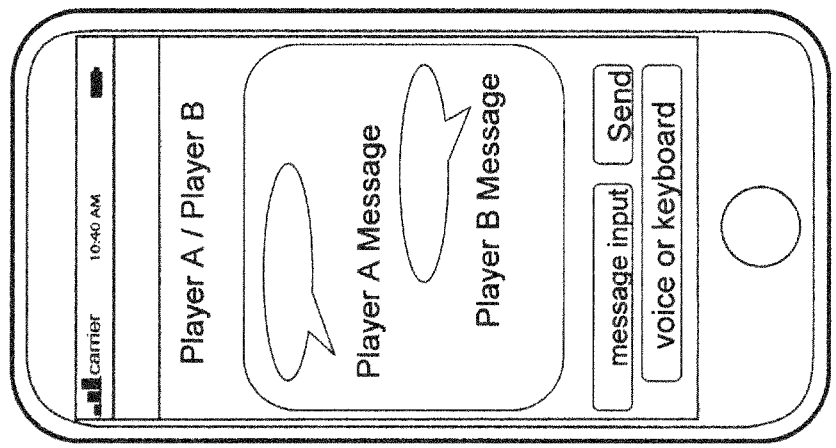
Figure 12C:
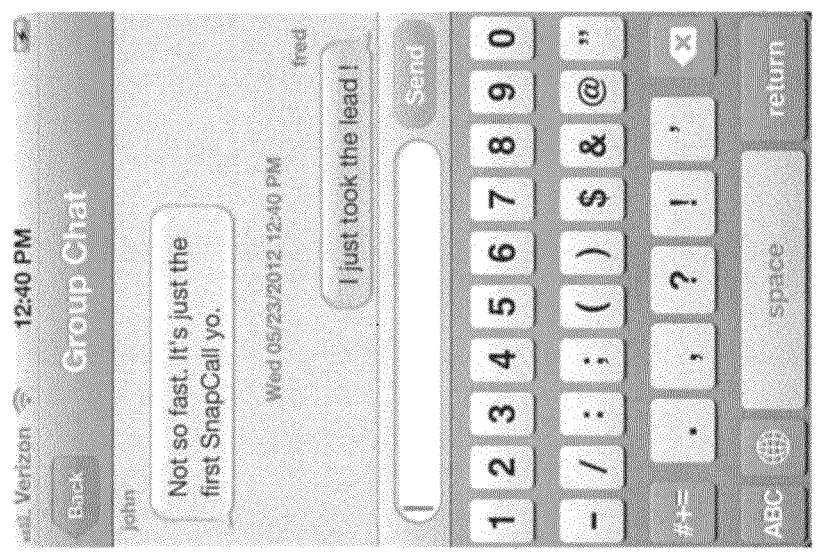

Another feature of one embodiment of the invention includes an In-Shootout chat. FIGS. 12A-C depict various embodiments of chat sessions available during game play. FIG. 12A depicts a one-to-one chat environment in which the two players' conversation stream on the display. While chat and messaging protocols exist outside of the application, the ability to communicate in-Shootout is advantageous because it provides a single place to compete and communicate, without having to leave the application and risk missing a question, poll or other activity.

Another embodiment includes a method for one-to-one player messaging by simply pushing on their friend's name within the Shootout screen (to enable socializing during events). A method for players to chat with one-to-group messaging (to enable socializing among a group of friends competing in a Shootout) may also be implemented as depicted in FIG. 12B. FIG. 12C depicts a screen capture of one embodiment in which a group chat is occurring. Other features supporting the one-on-one and group chat on the back end include support for hiding or listing a user as offline to maintain privacy, encryption of chat messages, and a visually appealing interface in which it is easier to differentiate users in a group chat, for example. According to one embodiment, a player may use a voice over IP (VOIP) feature to enable and participate in the chat feature. The chat feature may be invoked from any number of displays and menus within the application, including but not limited to, scoring pages, ranking pages, user profile pages or main event menus.

Figure 13B:
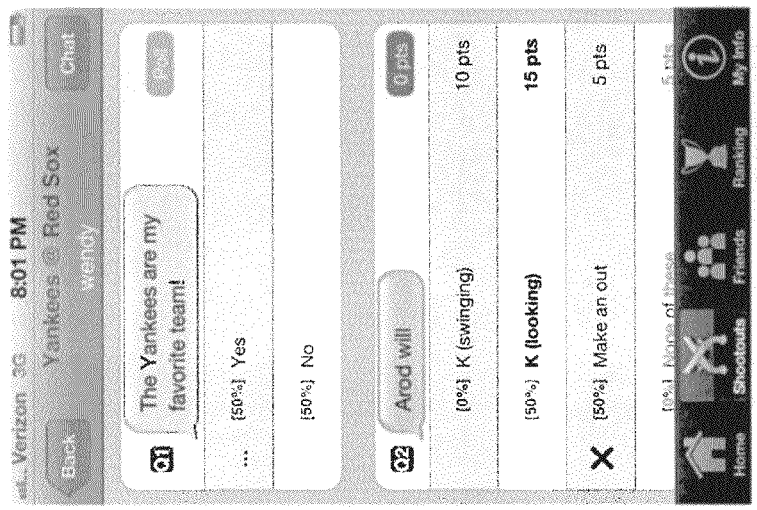
FIGS. 13A-13B are exemplary graphic user interfaces of various views of a friend's game play in accordance with illustrative embodiments.
Figure 13A:
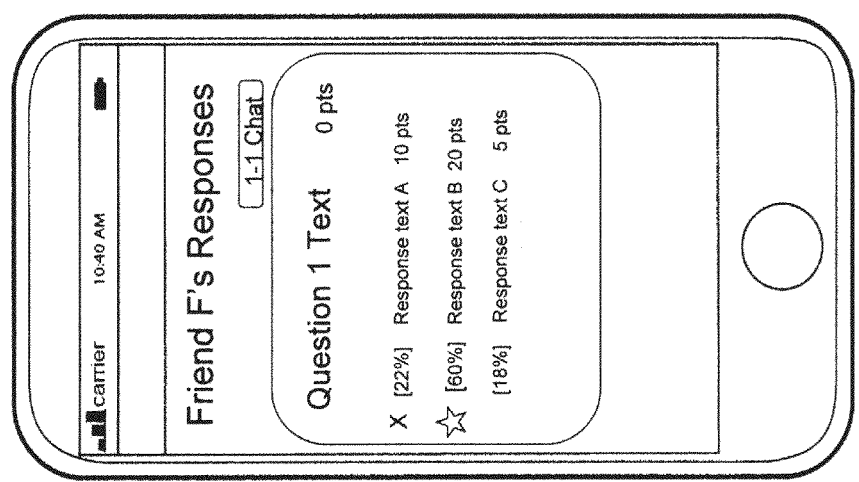

Another feature of the application includes listing various ranking metrics of players and friends. According to one embodiment, a player may select a friend's profile to view those friends' current answers during the shootout. FIGS. 13A and B depict illustrative displays of a player viewing such a friend's statistics. FIG. 13A depicts a display in which a player is viewing "Friend F's Responses. Indicators of the friends answer, the correct answer and other metrics, such as the percentage of players selecting each answer, may also be shown on the display. FIG. 13B depicts a player's screen when viewing a serialized listing of a friend's answers. Answers displayed may include poll answers, including audience percentages, as well as point-value questions and answers, again with percentages for the entire audience's responses. A player may also engage in a chat session with the Friend-in-view from this page.

Figure 14A:
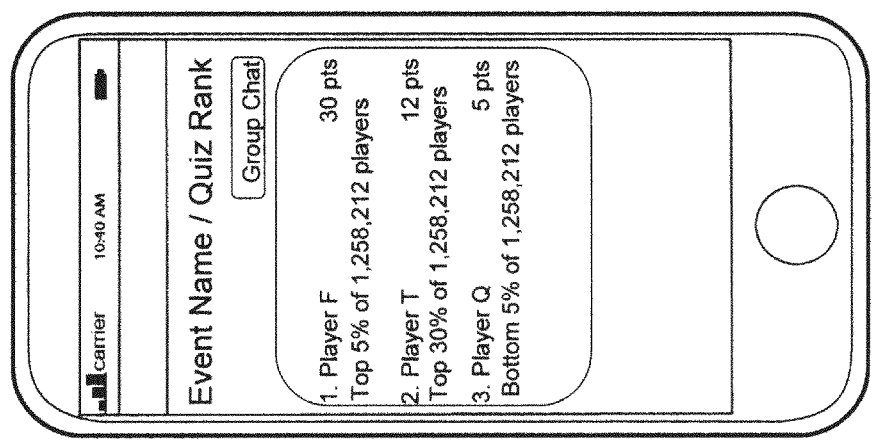
FIGS. 14A-14G are exemplary ranking displays and categorizations of a player's game play in accordance with illustrative embodiments.
Figure 14C:
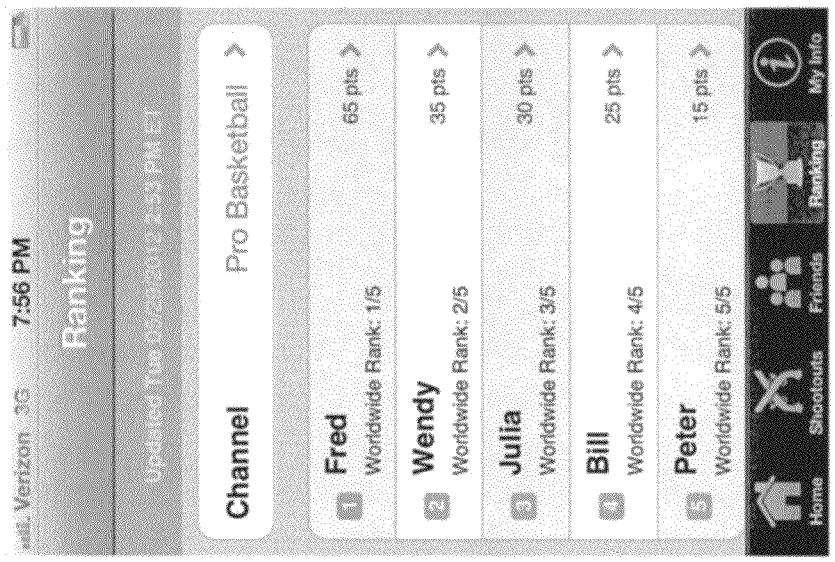
Figure 14B:
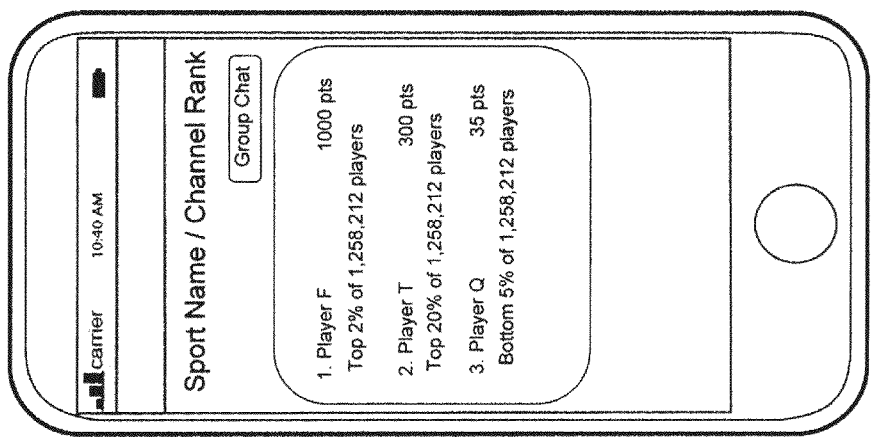

In addition to viewing a single friend's activity, embodiments of the invention include categorized and grouped rankings FIGS. 14A-14G depicts several embodiments in which various rankings are displayed on a user device. FIG. 14A depicts a ranking of top players according to the current event (i.e. current Shootout). Metrics displayed may include, but are not limited to, percentage rankings among the group, total number of players, and total points accumulated. FIG. 14B depicts rankings categorized and accumulated over the relevant season within a sport i.e. "channel". Similarly, FIG. 14C depicts a screen display for the channel categorized as "Pro Basketball," in which the top players in Pro Basketball Shootouts are ranked according to an accumulation of earned points over the relevant sports season.

Figure 14E:
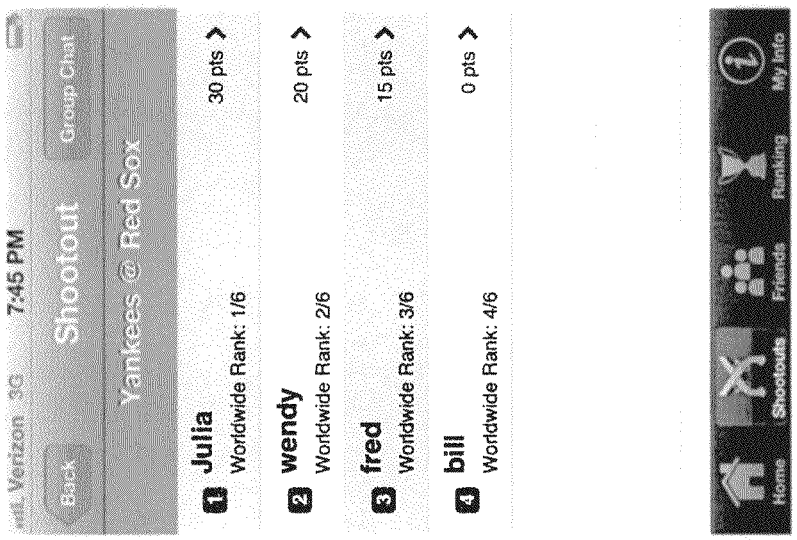
Figure 14D:
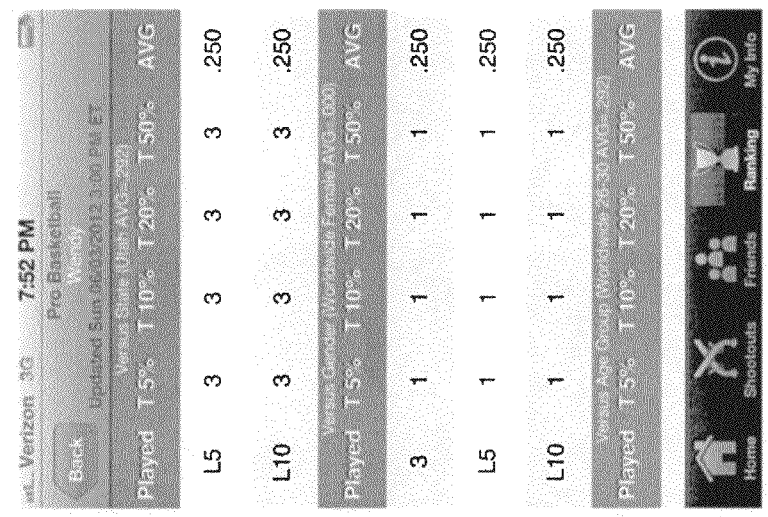
Figure 14G:
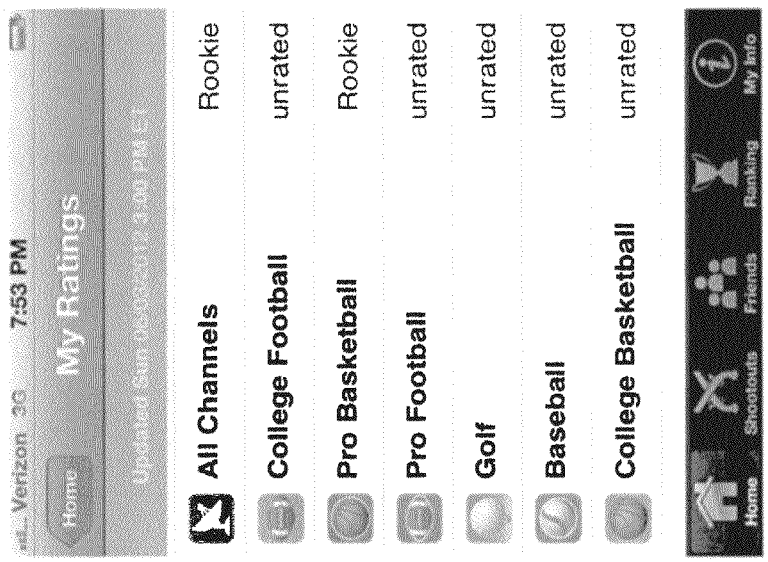
Figure 14F:
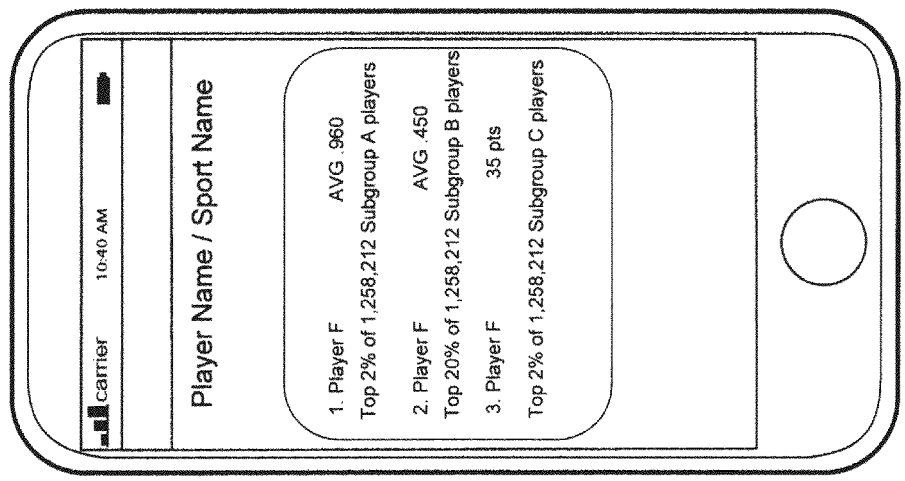

A player may select any of the offered channels from a drop down menu at the top of the display. The player may also filter results based upon any number of sub-categories, such as worldwide, country, state, city, current location (i.e. bar, club, arena, etc.). FIG. 14D depicts a player's longitudinal statistics within channels (i.e, individual sports or other activities) categorized as against certain demographic groups, such as players in the same state, gender, and age group. The ranking engine allows for users to filter statistics and rankings based on any recognizable metric recorded by the application. FIG. 14E depicts a ranking list of a player's friend within the same Shootout. Other information, such as worldwide rankings and other statistics may be displayed under each individual players name and score. FIG. 14F depicts a ranking categorization defined by a player within a given channel in which the individual player's rankings are broken down into sub-categories or groups.

According to the illustrative display, Player F's rankings across three subgroups of the entire audience for a given sport are displayed. The players ranking or success may be displayed as an average, a point total, or a numbered rank, or a percentile rank for example. Rankings may extend the competition for an entire season, thus minimizing the element of luck. Shootout rankings among friends within a Shootout may be implemented in real-time (after the answer is set by the Administrator) since answers are transmitted to each device immediately and the device is able to rank a limited set of friends quickly. Shootout worldwide rank (either percentile or actual rank) can take more time since an aggregation of data is required to make the worldwide rank calculation. This calculation time lag presents a display problem since the worldwide rank for each player could be out of synch with the friend's shootout rankings, which are real-time.

In order to resolve this problem, one embodiment of the invention uses an asynchronous method so that the shootout worldwide ranking is not displayed unless it is 100% consistent with the current scores being displayed the device, in other words when a friends ranking and Shootout Worldwide Ranking reflect the same point in time (same question ID). When a Rank Engine (the statistical engine that calculates and determines the rankings) catches up, then the shootout worldwide rank is shown. If a new question is asked then the application will go to a null display state on the device when the Administrator sets the answer for the next question. If this method is not selected, then users would not see a consistent presentation of both rank among friends and rank over a massive audience (unless rank among friends is delayed until the wider audience calculation finishes which is undesirable from the user perspective), given that real-time friend's rank can be accomplished in real-time by the device for a limited user population (i.e. friends) and audience-wide ranking (massive user population rank) requires the substantially greater computing power of the backend servers. Another feature of the application includes a rating method that computes a player's relative skill at predicting outcomes. Rating, according to one embodiment, is based on a standard deviation (i.e. distribution) of quiz results calculated nightly and presented nightly over a sports season. Ratings, as shown in FIG. 14G may take on human readable names (unrated, Elite Pro, Pro, Rookie, Hopeful).

Another feature of an embodiment of the invention includes a question authoring tool. The application provides a distributed, collaborative, networked authoring tool that is roles-based, meaning that a distributed population of writers have limited abilities in the system and can only act on events (start, stop, publish questions) to which they are assigned. The authorized capabilities are defined in the system as roles assigned to users. An advantage of a distributed authoring is that the distributed authoring environment may enable geographically dispersed game producers to cover a wider variety of events that if the authoring was centralized in one location. Another feature of the authoring tool is that is can that can start and stop an event. Stopping the event triggers follow up analysis such as event rank and channel rating. The authoring tool also enables a writer to set for each question the following illustrative attributes: question type (T/F, A/B, A/B/C, OVER/UNDER etc.), timer, point value overall, point value per response, and question-type which can drive other business logic e.g. poll-type auto-populates point value to 0 (or blank) and triggers other delayed analyses of audience responses.

Input device may be a keyboard, thumbboard, or touchscreen that are used to receive answers and other data from a user. In addition, input device can also include a plurality of other inputs or controls for adjusting and configuring a mobile device for playing the quiz game embodiments described herein. Output device may be a display device, such as an LCD or LED display screen, that can display one or more display quiz game or feeds from the sporting event or other event of interest such as configurable icons, buttons, input boxes, menus, tabs, key labels and so forth having multiple configurable dimensions, shapes, colors, text, data and sounds to facilitate operations with mobile device.

Storage may include removable or fixed, volatile or non-volatile or permanent or re-writable computer storage media. The computer readable medium can be any available medium that can be accessed by a general purpose or special purpose mobile device. By way of example, and not limitation, such a computer readable medium can comprise flash memory, RAM, ROM, electrically erasable programmable read only memory (EEPROM), optical disk storage, magnetic disk storage or other magnetic storage devices, or any other medium that can be used to store digital information on a mobile device.

The device, software, methods, and systems described herein can incorporate various network-based technologies and use any suitable network. In various embodiments, suitable network-based technologies for transmitting and receiving questions, answers, participant data, ads, and other data of interest and processed versions thereof include, but are not limited to cellular, TCP/IP, infrared (IR), satellite, Bluetooth, wide area network (WAN) and WLAN, Wireless Fidelity (Wi-Fi) such as 802.x standardized systems and are to be used generically when referring of any type of 802.11 network, whether IEEE 802.11b, 802.11a, 802.11g, 802.11n, 802.16, 802.20 dual-band, GPRS, CDMA, EDGE, WCDMA, CDMA2000, TD-SCDMA network, UWB/W-USB, ZigBee, NFC, LTE and WiMax.

Embodiments may operate over current mobile communication networks based on either Code Division Multiple Access (CDMA) or Global Systems Mobile (GSM) standards, or other systems. The game network can include and can be accessed using various protocols and auxiliary networks, including the suitable network-based technologies discussed above.

In addition to an administrative application and a participant device application resident on a given device 50, an overall service including certain hardware components, such as servers that route questions, answers, and ads can also be established to facilitate the transfer and processing of answers and the deliver or publication of ads while a sports event or other event simultaneously occurs relative to the quiz game. Servers suitable for performing the processing, routing, transmission, and archiving of quiz game data and participant identifiers can use a Windows-based operating system, a Mac based, a Linux-based operating system, a Unix-based operating system, or any other suitable open source or proprietary operating system.

It is to be appreciated that the mobile device includes software that acts as an intermediary between users and the basic resources described in mobile device. Such software preferably includes an operating system. The operating system, which can be resident in storage, acts to control and allocate resources of mobile device. System applications, such as the administrator software application or mobile device game application embodiments, take advantage of the management of resources by the operating system through program modules and program data stored either in system memory or on disk storage. Furthermore, it is to be appreciated that the present invention can be implemented with various operating systems or combinations of operating systems.

The computer readable medium tangibly embodies a program, functions, and/or instructions that cause the computer system to operate in a specific and predefined manner as described herein. Those skilled in the art will appreciate, however, that the process described below relating to question generation, response processing, scoring, and ranking in general as well as other features recited herein, may be implemented at any level, ranging from hardware to application software. For example, the administrator software application, software, modules, and other front-end and back-end components discussed herein may be implemented as software code to be executed by mobile device using any suitable computer language and may be stored on any of the storage media described above, or can be configured into the logic of mobile device. Such software code may be executed by mobile device using any suitable computer language such as, for example, Java, Javascript, C++, C, C#, Objective-C, Perl, database languages, APIs, various system-level SDKs, assembly, firmware, microcode, and/or other languages and tools.

These are representative components of a mobile device whose operation is well understood. Furthermore, those of ordinary skill in the art will appreciate that mobile devices shown and described herein are exemplary only and that the present invention can operate within a number of different mobile devices.

The present invention may be embodied in may different forms, including, but in no way limited to, computer program logic for use with a processor (e.g., a microprocessor, microcontroller, digital signal processor, or general purpose computer), programmable logic for use with a programmable logic device, (e.g., a Field Programmable Gate Array (FPGA) or other PLD), discrete components, integrated circuitry (e.g., an application Specific Integrated Circuit (ASIC)), or any other means including any combination thereof. In a typical embodiment of the present invention, some or all question generation, question transmission and response processing is implemented as a set of computer program instructions that is converted into a computer executable form, stored as such in a computer readable medium, and executed by a microprocessor under the control of an operating system. Thus, questions and response and input data are transformed into processor understandable instructions suitable for generating the desired rankings, advertising data, metadata, and other information of interest and other features and embodiments described herein.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, Objective-C, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink-wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as middleware and SDKs.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink-wrapped software), preloaded with a computer system (e.g., on system ROM or fixed disk), or distributed from a server or electronic bulletin board over the communication system (e.g., the Internet or World Wide Web).

Various examples of suitable processing modules are discussed below in more detail. As used herein a module refers to software, hardware, or firmware suitable for performing a specific data processing or data transmission task relating to the quiz game embodiments or administration of the same as described herein. Typically, in a preferred embodiment a module refers to a software routine, program, or other memory resident application suitable for receiving, transforming, routing and processing instructions, or various types of data and other information of interest.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system.

Memory may also include any means for storing software or other instructions including, for example and without limitation, a hard disk, an optical disk, floppy disk, DVD (digital versatile disc), CD (compact disc), memory stick, flash memory, ROM (read only memory), RAM (random access memory), DRAM (dynamic random access memory), PROM (programmable ROM), EEPROM (extended erasable PROM), and/or other like computer-readable media.

In general, computer-readable memory media applied in association with embodiments of the invention described herein may include any memory medium capable of storing instructions executed by a programmable apparatus. Where applicable, method steps described herein may be embodied or executed as instructions stored on a computer-readable memory medium or memory media. These instructions may be software embodied in various programming languages such as C++, C, Objective-C, Java, and/or a variety of other kinds of software programming languages that may be applied to create instructions in accordance with embodiments of the invention.

The embodiments, embodiments, features, and examples of the invention are to be considered illustrative in all respects and are not intended to limit the invention, the scope of which is defined only by the claims. Other embodiments, modifications, and usages will be apparent to those skilled in the art without departing from the spirit and scope of the claimed invention.

What is claimed is:

1. A computer-based method of synchronizing activity across a network including mobile devices with a live event, the method comprising:

synchronizing a plurality of backend servers to a trusted time source;

transmitting, from the backend servers, a first electronic message to a plurality of mobile devices, the first electronic message comprising a first server timestamp, and a question timer;

receiving a request for a second server timestamp from a mobile device;

transmitting the second server timestamp to the mobile device in a second electronic message from one of the plurality of backend servers;

a total in-transit time interval for the first electronic message calculated as: [(the second server timestamp−the first server timestamp)+(a factor)].

2. The method of claim 1 wherein the first electronic message comprises a question and a plurality of possible answers.

3. The method of claim 2 wherein the second electronic message comprises a mobile device generated answer to the question.

4. The method of claim 3 further comprising awarding points to a mobile account if the mobile generated answer is correct.

5. The method of claim 4 further comprising displaying a ranking of the mobile accounts according to awarded points.

6. The method of claim 5 further comprising categorizing rankings based on at least one of the categories chosen from the group consisting of: nation, world, league, friends, sport, location and event.

7. The method of claim 5 further comprising ranking users of the mobile device in real-time.

8. The method of claim 2 wherein each of the plurality of possible answers is associated with a point value.

9. The method of claim 8 wherein each of the point values is different, the different point values reflecting the probability associated with each possible answer.

10. The method of claim 1 wherein the factor is an estimate of the time to complete sending the request from the mobile device and receiving the second server timestamp at the mobile device.

11. The method of claim 1 further comprising grouping user accounts according to a user preference.

12. The method of claim 11 wherein the user preference is chosen from the group consisting of: friend, nation, world, sport, league, location, and favorite team.

13. The method of claim 1 further comprising providing a communication protocol between the mobile devices.

14. The method of claim 1 further comprising transmitting a third electronic message to the plurality of mobile devices, the third electronic message comprising an overlay.

15. The method of claim 14 wherein the overlay is a message selected from the group consisting of: an advertisement, celebrity message, administrative message, writer message, and filtered message.

16. The method of claim 1 further comprising generating the first electronic message from a distributed authoring tool.

17. The method of claim 16 wherein the authoring tool includes the capability to start and stop an event, an electronic message that initiates and an electronic message that ends the event.

18. A system for implementing a computer-based quiz game comprising:

a memory device; and a processor in communication with the memory device, wherein the memory device comprises instructions that when executed by the processor cause the processor to:

store the game question and the expiration event in a database;

route the game question using a data center to a population of mobile devices in a format suitable for display on a mobile device, the game question comprising a timer value and a first server timestamp;
receive a request for a second server timestamp from a mobile device;
transmit the second server timestamp to the mobile device;
receive a plurality of responses to the game question from the mobile devices, each of the responses comprising an answer to the question;
award a score to the response, if the response matches correct answer as defined in the in the system;
transmit a fourth message comprising correct answer for the game question;
rank users among friends by sorting total score using the device processor;
rank users against a player group that include the friends using backend processors, and transmit global rank to devices via another message.

19. The system of claim 18 wherein time remaining on each device is synchronized for each question by making a device by device adjustment of the question timer by subtracting: [(a second server timestamp−a first server timestamp)+(a factor)] from the question timer.

20. A computer-based method of synchronizing activity across a network, the method comprising:
selecting a live event displayed on a mobile device;
receiving a question, response choices, a timer value and a first server timestamp relating to the live event;
transmitting a request to the backend server for a second server timestamp;
receiving an input from a user of the mobile device; and
transmitting a response choice to the backend server within a period of time calculated as (the timer value)−[(a second server timestamp−a first server timestamp)+(a factor)].

21. The method of claim 20 further comprising the step of displaying the question on the mobile device if the period of time is non-zero.

22. The method of claim 20 wherein selecting the live event generates a backend message and transmits the backend message to a MOM server.

23. The method of claim 22 wherein a plurality of engines monitors the MOM server and wherein one or more engines process the backend message to add the user of the mobile device to a trivia game relating to the live event.

* * * * *